United States Patent
Quirynen et al.

(10) Patent No.: US 10,996,639 B2
(45) Date of Patent: May 4, 2021

(54) MODEL PREDICTIVE CONTROL OF SYSTEMS WITH CONTINUOUS AND DISCRETE ELEMENTS OF OPERATIONS

(71) Applicant: Mitsubishi Electric Research Laboratories, Inc., Cambridge, MA (US)

(72) Inventors: Rien Quirynen, Boston, MA (US); Pedro Hespanhol, Berkeley, CA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 168 days.

(21) Appl. No.: 16/297,870

(22) Filed: Mar. 11, 2019

(65) Prior Publication Data
US 2020/0293009 A1  Sep. 17, 2020

(51) Int. Cl.
*G05B 13/04* (2006.01)
*B60W 50/00* (2006.01)

(52) U.S. Cl.
CPC ....... *G05B 13/048* (2013.01); *B60W 50/0097* (2013.01); *G05B 13/041* (2013.01); *B60W 2050/0024* (2013.01)

(58) Field of Classification Search
CPC ............... G05B 13/048; G05B 13/041; B60W 50/0097; B60W 2050/0024
USPC ........................................................ 700/44
See application file for complete search history.

(56) References Cited

U.S. PATENT DOCUMENTS

| | | | |
|---|---|---|---|
| 2015/0354877 A1* | 12/2015 | Burns | G05B 13/00 62/115 |
| 2016/0147203 A1* | 5/2016 | Di Cairano | G05B 13/042 700/30 |
| 2016/0194095 A1* | 7/2016 | Weiss | B64G 1/26 701/13 |
| 2016/0357169 A1* | 12/2016 | Di Cairano | G05B 13/048 |
| 2017/0269610 A1* | 9/2017 | Weiss | B64G 1/286 |
| 2018/0087357 A1* | 3/2018 | Conn | E21B 43/2408 |
| 2020/0133210 A1* | 4/2020 | Zheng | G05B 13/048 |
| 2020/0148261 A1* | 5/2020 | Varunjikar | G06N 5/022 |

* cited by examiner

*Primary Examiner* — Kenneth M Lo
*Assistant Examiner* — Mohammed Shafayet
(74) *Attorney, Agent, or Firm* — Gennadiy Vinokur; Hironori Tsukamoto

(57) ABSTRACT

A controller for controlling a system with continuous and discrete elements of operation accepts measurements of a current state of the system, solves a mixed-integer model predictive control (MI-MPC) problem subject to state constraints on the state of the system to produce control inputs to the system, and submits the control inputs to the system thereby changing the state of the system. To solve the MI-MPC, the controller transforms the state constraints into state-invariant control constraints on the control inputs to the system, such that any combination of values for the control inputs, resulting in a sequence of values for the state variables that satisfy the state constraints, also satisfy the state-invariant control constraints, and solve the MI-MPC problem subject to the state constraints and the state-invariant control constraints.

19 Claims, 25 Drawing Sheets

Algorithm 3 B&B Method for the MIQP-OCP in (1)

Input: Upper bound UB, tolerance $\epsilon$.

1: $LB = -\infty$ and initialize $L = \{P_0\}$ with root node. ～510
2: Select current node $P_c \leftarrow P_0$. ～511
3: while $UB - LB > \epsilon$ do
4:     Apply domain propagation to $P_c$ using Alg. 2. ～520
5:     Solve resulting QP relaxation with PRESAS. ～521
6:     if QP is feasible and $J(\bar{X}, \bar{U}) \le$ UB then ～525
7:       if QP solution is not integer-feasible then ～535
8:         $LB \leftarrow \min_{P \in L} J(P)$.
9:         Select branching variable $v$ using Alg. 1. ～545
10:        Create subproblems $P_u$ "up" and $P_l$ "down". ～550
11:        Append $\{P_l, P_u\}$ to $L$ if $(1-v)\phi_v^+ < v\phi_v^-$
         or append $\{P_u, P_l\}$ to $L$, otherwise.
12:       else
13:         $UB \leftarrow J(\bar{X}, \bar{U})$ and $(X^*, U^*) \leftarrow (\bar{X}, \bar{U})$. ～530
14:       end if
15:     end if
16:     Remove current node $P_c$ from to-do list in $L$. ～540
17:     Select next node based on depth-first (last node ～515
     in list $L$) or based on best lower bound.
18: end while

Output: MIQP solution vector $(X^*, U^*)$. ～355

Fig. 5C

| Algorithm 2 Domain Propagation for Bound Strengthening |
|---|
| Input: Inequality constraints (7b), variable bounds $\bar{u}_i, \underline{u}_i$. |
| 1: while stopping criterion == False do |
| 2:    for every row of $D_c$ do |
| 3:       for every $u_i \in U, d_i \neq 0$ do |
| 4:          Obtain bound values $\bar{u}_{b,i}, \underline{l}_{b,i}$ using Eq. (10). |
| 5:          Update variable bounds using (11) or (12). |
| 6:       end for |
| 7:    end for |
| 8: end while |
| Output: Updated bounds $\bar{u}_i, \underline{u}_i$ for all control variables. |

Fig. 7B

Algorithm 1 Reliability Branching Strategy

Input: $\eta_{rel}$, set $C$ of candidate variables for branching. ~ 801

1: for candidate variables $u_{i,k}$ in $C$ do ~ 803
2:    if #branch($u_{i,k}$) $\leq \eta_{rel}$ then ~ 802
3:       Strong branching on $u_{i,k}$ to compute score $S_{i,k}$. ~ 805
4:       Update pseudo-costs $\phi^-_{i,k}$ and $\phi^+_{i,k}$. ~ 810
5:    else
6:       $S_{i,k} = \text{score}(\bar{u}_{i,k}\, \phi^-_{i,k},\, (1 - \bar{u}_{i,k})\, \phi^+_{i,k})$. ~ 815
7:    end if
8: end for

Output: Select variable with highest score $S^* = \max_{i,k} S_{i,k}$. ~ 816

Fig. 8

Algorithm 4 Tree Propagation for Warm-Started B&B

Input: Optimal path $P$ from root to leaf node.
1: Shift index of branched variables by 1 stage along path. ~ 901-906
2: Solve root node of shifted path $P$, including presolve. ~ 920
3: for (branched variables on stage $-1$ after shifting) ~ 911
   ‖ (variables are integer feasible in root node)
   ‖ (variables without pseudo-costs) do ~ 925
4:   remove associated node from the path $P$. ~ 914
5: end for
6: Shift the QP relaxation solution on every node of the path and store it as a warm start for the QP solver. ~ 926
7: Re-order sequence of branched variables by scoring based on warm-started pseudo-cost information. ~ 927
8: Initialize the B&B tree along the shifted path $P$, creating nodes along the path and their respective children. ~ 928
9: Create the warm-started list $L$, excluding parent nodes. ~ 929

Output: Warm-started tree for next MIQP, given by list $L$.

Algorithm 5 Warm-Started B&B Algorithm for MI-MPC

Input: Current state $\hat{x}_0$, list of nodes $L$ and pseudo-costs.

```
Solve MIQP
```
1: Update condensing information, given current state $\hat{x}_0$.  ~ 610
2: Formulate MIQP (1) and solve it using Algorithm 3.  ~ 350
3: Apply new control input $u_0^*$ to the system.  ~ 111

```
Propagation Step
```
4: Warm-start and shift pseudo-cost information.  ~ 935
5: Perform tree propagation to warm-start node list $L$ for the next MI-MPC time step (see Algorithm 4).  ~ 930

Fig. 9C

MODEL PREDICTIVE CONTROL OF SYSTEMS WITH CONTINUOUS AND DISCRETE ELEMENTS OF OPERATIONS

TECHNICAL FIELD

The invention relates generally to model predictive control, and more particularly to methods and apparatus for model predictive control of systems with continuous and discrete elements of operations.

BACKGROUND

Optimization based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites and power generators.

The MPC is based on a real time finite horizon optimization of a model of a system. The MPC has the ability to anticipate future events, and to take appropriate control actions. This is achieved by optimizing the operation of the system over a future finite time-horizon subject to constraints, and only implementing the control over a current time step.

The MPC can predict the change in state variables of the modeled system caused by changes in control variables. The state variables define a state of the system, i.e., a state of a controlled system is a smallest set of state variables in state-space representation of the control system that can represent the entire state of the system at any given time. For example, if a controlled system is an autonomous vehicle, the state variables may include position, velocity and heading of the vehicle. Control variables are inputs to the system designed to change a state of the machine. For example, in a chemical process, the control variables are often pressure, flow, temperature, opening of the valves, and stiffness of dampers. State variables in these processes are other measurements that represent either control objectives or process constraints.

The MPC uses models of the system, the current system measurements, the current dynamic state of the process, and state and control constraints to calculate future changes in the state variables. These changes are calculated to hold the state variables close to target subject to constraints on both control and state variables. The MPC typically sends out only the first change in each control variable to be implemented, and repeats the calculation when the next change is required.

The MPC framework can be further extended to hybrid systems with continuous and discrete elements of operations that involve both continuous and discrete variables in the model, objective and/or constraints that describe the dynamics of the system, performance metric and/or objective of control. Such an extension can provide a powerful technique to model a large range of problems, e.g., including dynamical systems with mode switching or quantized control, problems with logic rules or no-go zone constraints. However, the resulting optimization problems are highly non-convex, and therefore difficult to solve in practice. MPC is designed to operate in continuous space, while discrete variables can assume only a specific set of typically integer values. When using a quadratic objective in combination with linear system dynamics and linear inequality constraints, the resulting optimal control problem (OCP) can be formulated as a mixed-integer quadratic program (MIQP) that needs to be solved in order to implement a mixed-integer model predictive control (MI-MPC) method.

The MPC numerical methods are implemented on various computational apparatus often designed specifically for a given system. Computational apparatus can range from inexpensive fixed-point precision embedded controllers to sophisticated multi-core central processing units (CPU), graphics processing unit (GPU), field-programmable gate array (FPGA), or dedicated parallel computer clusters. However, the MPC extension to hybrid systems is extra computationally demanding. In addition to performing a moving horizon optimization, a hybrid MPC controller aims to solve such a mixed-integer (MI) program at every sampling time instant. This is a difficult combinatorial task, because mixed-integer programming is NP-hard in general.

In a number of practical applications, there is a need to implement MI-MPC on an embedded control system with limited computational capabilities. An embedded control system is a programmed controlling and operating system with a dedicated function within a larger mechanical or electrical system, often with real-time computing constraints. It is embedded as part of a complete device often including hardware and mechanical parts. Examples of properties of typical embedded control systems when compared with general-purpose counterparts are low power consumption, small size, rugged operating ranges, and low per-unit cost. This comes at the price of limited processing resources, which make embedded systems more difficult to program and to interact with.

Due to complexity of MI-MPC controllers, it is challenging to implement such a controller on an embedded control system arranged for real-time control. For example, to the best of our knowledge, it is impractical to implement MI-MPC for complex dynamical systems, such as an autonomous vehicle, on certified embedded control hardware that is typically used by current advanced driver-assistance systems (ADAS).

Accordingly, there is a need for tailored optimization and solver implementation for embedded MI-MPC applications running on microprocessors with restricted computational resources and available memory.

SUMMARY

Some embodiments are based on recognition that current MPC solvers are ill-suited for solving mixed-integer model predictive control (MI-MPC) problems. This is because the MPC solver is designed for optimization within continuous state and control space over a control horizon. However, when some of the optimization variables, such as control inputs for controlling the system, are discrete variables assuming values belonging to a discrete set of values, the search space of the optimal solution is not continuous.

Some embodiments are based on recognition that the solution of the MI-MPC includes two stages. The first stage is a search stage that includes searching for different values of discrete variables that may belong and/or may lead to the solution. For example, the objective of the search stage is to find a continuous portion of a relaxed search space that may include the discrete optimal solution. The second stage is an optimization stage that involves solving an MPC problem within the continuous portion of the relaxed search space identified during the search stage. The search stage is usually an iterative process that tries different combinations of values for discrete variables to find multiple portions of the relaxed continuous search space. The optimization stage is performed for each portion of the relaxed continuous search space and/or combination of discrete variables selected by the search stage. Hence, the solution of the MI-MPC problem usually involves multiple solutions of MPC problems. Because the MI-MPC problem needs to be solved for each control step, solving a potentially large number of MPC problems for each control step is computationally challenging especially for microprocessors of embedded systems.

For example, let us consider a system under control that has only one discrete variable having a value of either zero or one. In this example, it is relatively easy to formulate and solve two MPC problems: one MPC problem for a value of the variable equals zero and another MPC problem for a value of the variable equals one. Each of these two MPC problems aims to optimize a performance metric according to an objective function of the MPC problem. With fixed value of a single discrete variable, both of these MPC problems involve optimization within continuous state and control spaces. The solutions of these two MPC problems can be compared with each other and the more optimal solution, i.e., the one that has better value of the performance metric, can be selected as the solution of the ultimate MI-MPC problem.

However, practical applications can have quite a few discrete variables. Even if the MI-MPC problem involves only a small number of discrete variables, then each of these discrete variables can be different values at each time step in the MPC prediction horizon, resulting in a relatively large number of discrete variables in the overall mixed-integer program. Possible combinations of values for these discrete variables grow exponentially and can result in the necessity to solve a voluminous or even intractable number of MPC problems for each control step. Some embodiments are based on recognition that in order to reduce the computational burden of an MI-MPC solver, there is a need to reduce the number of potential combinations of values for discrete variables that need to be tested in order to find the discrete optimal solution.

Some embodiments are based on recognition that constraints on the operation of the system under control, such as constraints on a state variable of the system, are enforced during the solution of the relaxed MPC problem. This should not come as a surprise, because one of the advantages of MPC is in its ability to enforce the constraints of the system when finding the optimal solution. Hence, it is natural for an MI-MPC solver to use the state constraints during the optimization stage to solve the relaxed MPC problem subject to the state constraints.

However, some embodiments are based on realization that state constraints can also be used during the search stage to reduce the number of relaxed MPC problems to be solved to find a solution to the MI-MPC problem. On the first glance, search space is defined for optimization variables, such as control inputs to the system, and the state variables are outside of that search space of interest. However, some embodiments are based on realization that there is a strong dependency of admissible values for control inputs on the current state of the system and the state constraints. Hence, for each current state of the system, the state constraints can be transformed to constraints on control inputs to tighten the search space and thereby reduce the number of MPC problems that are solved to find a solution to the MI-MPC problem.

For example, some embodiments transform the state constraints into state-invariant control constraints on the control inputs to the system and solve the MI-MPC problem subject to the state constraints and the state-invariant control constraints. As used herein, state-invariant control constraints are such that any combination of values for the control inputs that satisfy the state-invariant control constraints result in a sequence of values for the state variables that satisfy the state constraints. Therefore, the state-invariant control constraints need to be either equivalent or a conservative, i.e., an over-representation of the state constraints for a particular current state of the system and for a particular combination of values for some of the discrete variables. In effect, these additional state-invariant control constraints allow reducing the number of MPC problems to be solved for each control time step, which in turn reduces the computational requirements for the MI-MPC solver, allowing one to implement such a solver on a microprocessor of an embedded control system.

For example, let us consider a control system that accepts two discrete control inputs with values of either zero or one. If the state-invariant control constraints would specify that the first control input has a value greater than 0.3, it means that the value of the first control input is one, which greatly reduces the number of combinations of different values for the control inputs.

To that end, one embodiment selects multiple combinations of different values for at least a subset of control inputs to a system that satisfy the state-invariant control constraints, solves an MPC problem for each combination of different values for the control inputs to produce a set of relaxed MPC solutions optimizing a performance metric according to an objective function of the MPC problem, and selects a solution of the MI-MPC problem from the set of relaxed MPC solutions corresponding to an optimal value of the performance metric. This embodiment simplifies the combinatorial problem of selecting a possible set of values for discrete variables to reduce the computational burden on a controller using an MI-MPC solution to control the system.

Additionally, or alternatively, some embodiments are based on realization that state-invariant control constraints can be combined with some additional methods that can reduce the search space of the optimal solution to an MI-MPC problem. For example, some embodiments use a branch-and-bound method that searches for a solution of an MI-MPC problem within a search space defined by relaxation of the discrete set of values for the control inputs into a continuous search space. The branch-and-bound method merges the fragmented search space of the control inputs into an over-inclusive continuous space, navigates through that space and computes lower and upper bounds to the objective value for the optimal solution in order to further reduce the number of MPC problems that need to be solved to find the optimal solution to the MI-MPC problem.

For example, let us consider a control system that accepts two discrete control inputs with values of either zero or one. If the solution of a relaxed MPC problem for a value of a first control input between zero and one and for a value of zero for a second control input is less optimal than a solution of the MPC problem for a value of the first control input between zero and one and for a value of one for the second control input, there is no need to test optimality of solutions for the MPC problems for the second control input of zero and the first control input of either zero or one. The previous comparison of relaxed MPC solutions indicates that these solutions would not be optimal.

To that end, one embodiment solves the MI-MPC problem with a branch-and-bound method that searches for a solution of an MPC problem within a search space defined by relaxation of the discrete set of values into a portion of continuous search space that satisfies the state-invariant control constraints. In effect, this embodiment tightens the search space of the branch-and-bound method to reduce computational burden on the controller. For example, in some implementations, the branch-and-bound method iteratively partitions the search space until the solution of the MPC problem belonging to the discrete set of values is found. The state-invariant control constraints tighten the search space to reduce the number of MPC problems that are solved to find an optimal solution. In some implementations, each MPC problem is solved subject to both the state and control constraints to account for approximation of the state constraints by the state-invariant control constraints.

Additionally, or alternatively, some embodiments can further reduce computational complexity of the MI-MPC problem by providing an efficient solution of the underlying MPC problems. For example, some embodiments aim to solve block-sparse mixed-integer optimal control problems to implement MPC for hybrid systems, such that problem sparsity can be used to efficiently solve the continuous optimization problem relaxations in a branch-and-bound method.

Some embodiments are based on the realization that the block-sparse mixed-integer optimal control problems result in separable constraints on some of the state and control input variables over time instances of the MPC control horizon that cannot be used directly to construct more tight constraints for some of the other state and control input variables. Hence, some embodiments transform each of the state constraints by writing the state variables at a certain time instant as a function of the initial state value and as a function of all control input variables at all the previous time instants in the MPC control horizon. For example, in some embodiments, bound constraints on a specific state variable at a specific time instant can be transformed as a constraint on all control input variables at all the previous time instants by use of backpropagation based on the system dynamics.

However, some embodiments are based on the realization that the reformulation of state constraints as a function of control input variables at the previous time instants introduces coupling between the optimization variables at different time points in the MPC control horizon, which destroys the problem sparsity that allows the efficient solution of the continuous optimization problem relaxations in a branch-and-bound method. Hence, some embodiments, when some of the state-invariant control constraints are coupled with each other for some or all time instances of a control horizon of the MPC problem, decouple the state-invariant control constraints to form the search space.

For example, some implementations perform a domain propagation procedure in order to derive new and separable state-invariant constraints on each of the individual control input variables, starting from the reformulated constraints that couple all the control input variables at different time instants in the MPC control horizon. Some embodiments are based on the realization that these newly derived state-invariant control bound constraints can be used to strengthen the continuous optimization problem relaxations in a branch-and-bound method, by tightening the existing constraints on continuous state and control input variables and/or by potentially fixing certain discrete state and/or control input variables to one of their discrete set of allowed values. In effect, these constraints reduce the number of MPC problems to be solved while preserving the sparsity of the MPC problems.

Additionally, or alternatively, some embodiments are based on realization that an implementation of model predictive control for hybrid systems requires the solution of a mixed-integer programming problem at each control time step, such that some of the information that is obtained in the discrete solution method can be reused from one control time step to the next. More specifically, some embodiments construct a warm started branch-and-bound tree that includes a time shifted version of the solution path from the previous time step of applying MPC to the hybrid system, in order to faster find a new bound value that can be used to prune branches in the search tree. To that end, some embodiments initialize the optimal solution of the MPC problem for the nested tree of regions for the current control step with a time propagation of the optimal solution of the MPC problem for the nested tree of regions determined for a previous control step.

For example, one embodiment re-orders the branching order in the warm started tree, based on pseudocost information that is gathered by the branch-and-bound method at the previous control time step. Another embodiment eliminates branching decisions from the warm started tree in case they correspond to variables that have not recently and/or not sufficiently been branched on. Yet another embodiment uses data-based learning to provide a warm started solution guess to more efficiently solve each of the continuous optimization problem relaxations in the branch-and-bound method.

Additionally, or alternatively, it is an object of some embodiments to use mixed-integer programming to implement model predictive control for hybrid systems that involve both continuous and discrete variables in the model, objective and constraints that, respectively, describe the system, the performance metric and control problem. In some embodiments, at least a subset of control variables for controlling a system assumes only discrete values. In some applications, the discrete values are binary. For example, a control valve in an air conditioning system that can be either ON or OFF. In some applications, the discrete values can assume more than two values. For example, gear shifting in an automobile can have up to five or six different values. In some applications, the discrete values of the control inputs directly govern the physical state of various devices. For example, a binary control command can run or stop the thrusters of a satellite. In some applications, the discrete values of the control inputs indirectly govern the physical state of various devices. For example, the integer values of a control command can control pulse-width-modulation of a power amplifier. In some applications, the discrete values of the control inputs are integer values. In alternative applications, the discrete values of the control inputs are not integer but can be encoded as integer values. For example, there are a limited number of actions or objectives the autonomous vehicle can undertake at any given instance of time. Those objectives can be encoded as integer values and used by the MI-MPC solver of some embodiments to control the motion of the vehicle.

Accordingly, one embodiment discloses a controller for controlling a system with continuous and discrete elements of operation, wherein at least a subset of the control inputs for controlling the system are discrete variables assuming values belonging to a discrete set of values. The controller includes a processor configured to accept measurements of a current state of the system; solve a mixed-integer model predictive control (MI-MPC) problem for each control step to produce control inputs to the system, and submit the control inputs to the system thereby changing the state of the system. The processor solves the MI-MPC problem subject to state constraints on a state of the system, wherein for a current control step the processor is configured to transform the state constraints into state-invariant control constraints on the control inputs to the system, such that any combination of values for the control inputs, resulting in a sequence of values for the state variables that satisfy the state constraints, also satisfy the state-invariant control constraints; and solve the MI-MPC problem subject to the state constraints and the state-invariant control constraints.

Another embodiment discloses a method for controlling a system with continuous and discrete elements of operation, wherein at least a subset of the control inputs for controlling the system are discrete variables assuming values belonging to a discrete set of values, wherein the method uses a processor coupled with stored instructions implementing the method, wherein the instructions, when executed by the processor carry out at least some steps of the method, including accepting measurements of a state of the system; solving a mixed-integer model predictive control (MI-MPC) problem subject to state constraints on the state of the system to produce control inputs to the system; and submitting the control inputs to the system thereby changing the state of the system. Solving the MI-MPC problem includes transforming the state constraints into state-invariant control constraints on the control inputs to the system, such that any combination of values for the control inputs, resulting in a sequence of values for the state variables that satisfy the state constraints, also satisfy the state-invariant control constraints; and solving the MI-MPC problem subject to the state constraints and the state-invariant control constraints.

Yet another embodiment discloses a non-transitory computer readable storage medium embodied thereon a program executable by a processor for performing a method. The method includes accepting measurements of a state of the system; solving a mixed-integer model predictive control (MI-MPC) problem subject to state constraints on the state of the system to produce control inputs to the system; and submitting the control inputs to the system thereby changing the state of the system. Solving the MI-MPC problem includes transforming the state constraints into state-invariant control constraints on the control inputs to the system, such that any combination of values for the control inputs, resulting in a sequence of values for the state variables that satisfy the state constraints, also satisfy the state-invariant control constraints; and solving the MI-MPC problem subject to the state constraints and the state-invariant control constraints.

BRIEF DESCRIPTION OF THE DRAWINGS

FIG. 5C is a pseudo code of a branch-and-bound mixed-integer optimization algorithm to search for the integer-feasible optimal control solution based on a nested tree of search regions and corresponding lower/upper bound values.

FIG. 7B is a pseudo code of a bound strengthening method that computes decoupled and tight state-invariant control input constraints based on domain propagation.

FIG. 8 is a pseudo code of a reliability branching strategy for selecting the discrete control input variable in the integer control variable search stage.

FIG. 9B is a pseudo code of a tree propagation-based warm starting strategy for the binary control variable search tree from one control time step to the next;

FIG. 9C is a pseudo code of a predictive controller for a hybrid system based on mixed-integer model predictive control in combination with a tree propagation-based warm starting strategy.

DETAILED DESCRIPTION

Some embodiments of the invention provide a system and a method for controlling an operation of a system or a system using a predictive controller. An example of the predictive controller is a model predictive control (MPC) determining control inputs based on a model of the controlled system.

Figure 1:
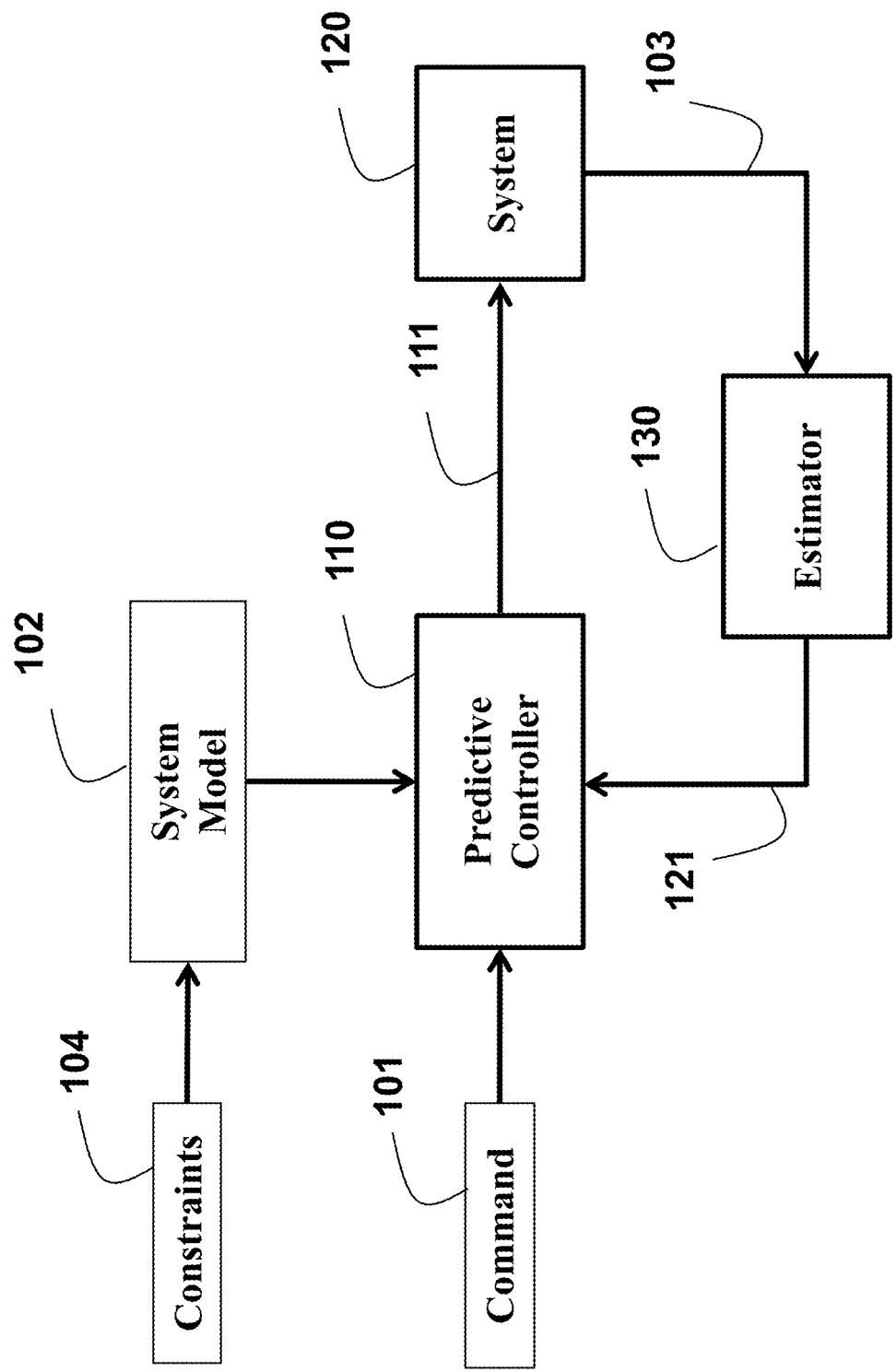
FIG. 1 is a block diagram of a predictive controller and feedback system according to some embodiments.

FIG. 1 shows an example system 120 connected to a predictive controller 110 via a state estimator 130 according to some embodiments. In some implementations, the predictive controller is an MPC controller programmed according to a dynamical model 102 of the system. The model can be a set of equations representing changes of the state and output 103 of the system 120 over time as functions of current and previous inputs 111 and previous outputs 103. The model can include constraints 104 that represent physical and operational limitations of the system. During the operation, the controller receives a command 101 indicating the desired behavior of the system. The command can be, for example, a motion command. In response to receiving the command 101, the controller generates a control signal 111 that serves as an input for the system. In response to the input, the system updates the output 103 of the system. Based on measurements of the output of the system 103, the estimator updates the estimated state of the system 121. This estimated state of the system 121 provides the state feedback to the controller 110.

The system 120, as referred herein, can be any machine or device controlled by certain manipulation input signals 111 (inputs), possibly associated to physical quantities such as voltages, pressures, forces, torques, and to return some controlled output signals 103 (outputs), possibly associated to physical quantities such as currents, flows, velocities, positions indicative of a transition of a state of the system from a previous state to the current state. The output values are related in part to previous output values of the system, and in part to previous and current input values. The dependency on previous inputs and previous outputs is encoded in the state of the system. The operation of the system, e.g., a motion of components of the system, can include a sequence of output values generated by the system following the application of certain input values.

A model of the system 102 can include a set of mathematical equations that describe how the system outputs change over time as functions of current and previous inputs, and the previous outputs. The state of the system is any set of information, in general time varying, for instance an appropriate subset of current and previous inputs and outputs, that, together with the model of the system and future inputs, can uniquely define the future motion of the system.

The system can be subject to physical limitations and specification constraints 104 limiting the range where the outputs, the inputs, and also possibly the states of the system are allowed to operate.

The controller 110 can be implemented in hardware or as a software program executed in a processor, e.g., a microprocessor, which at fixed or variable control period sampling intervals receives the estimated state of the system 121 and the desired motion command 101 and determines, using this information, the inputs, e.g., the control signal 111, for operating the system.

The estimator 130 can be implemented in hardware or as a software program executed in a processor, either the same or a different processor from the controller 110, which at fixed or variable control period sampling intervals receives the outputs of the system 103 and determines, using the new and the previous output measurements, the estimated state 121 of the system 120.

Figure 2:
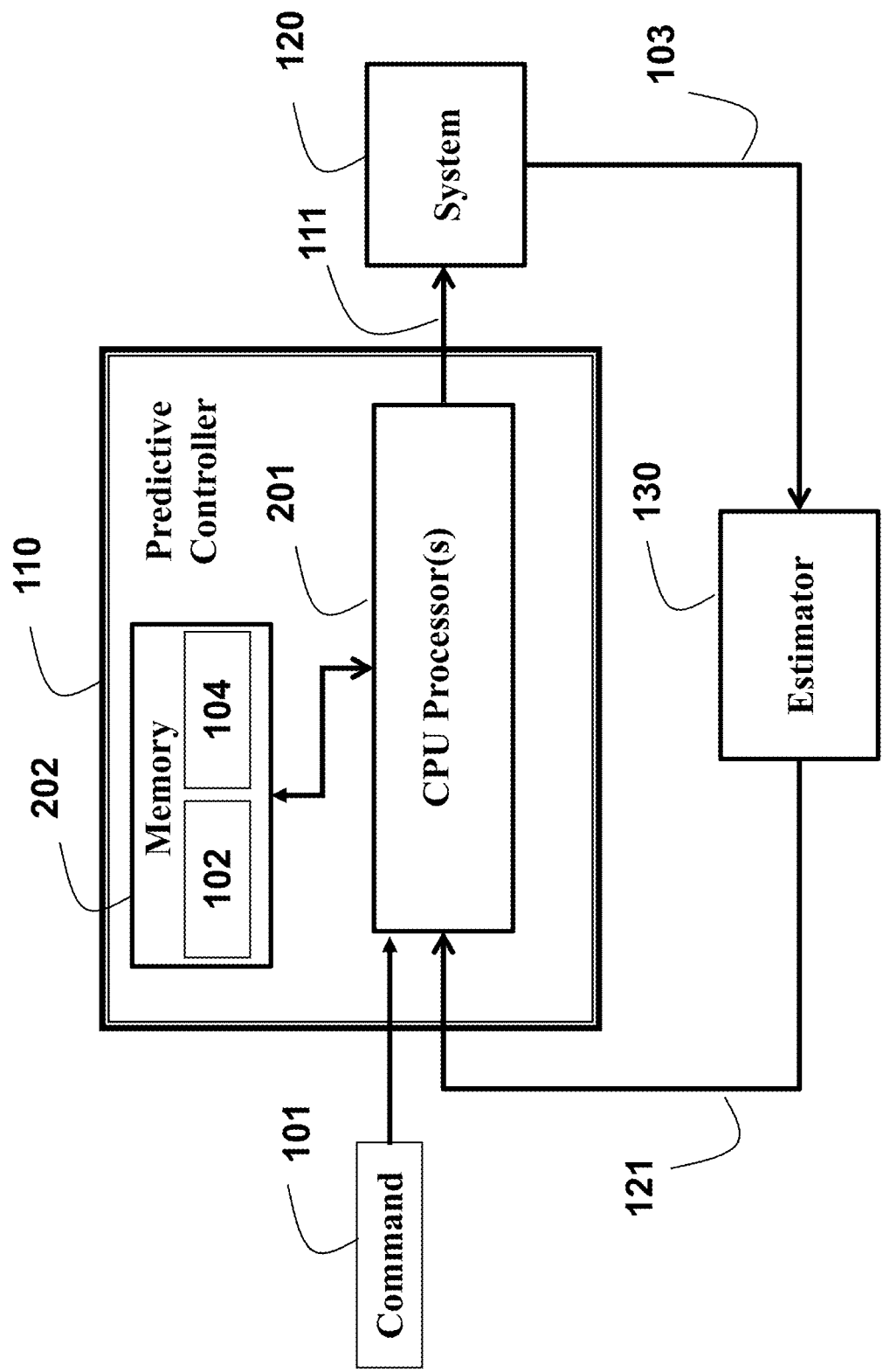
FIG. 2 is a block diagram of a controller, implemented using CPU processors and memory, and feedback system according to some embodiments of the invention.

FIG. 2 shows a block diagram of a controller 110 according to some embodiments, which actuates the system such that the estimated state 121 of the system and output 103 follow a command 101. The controller 110 includes a computer, e.g., in the form of a single central processing unit (CPU) or multiple CPU processors 201 connected to memory 202 for storing the model 102 and the constraints 104 on the operation of the system.

Figure 3A:
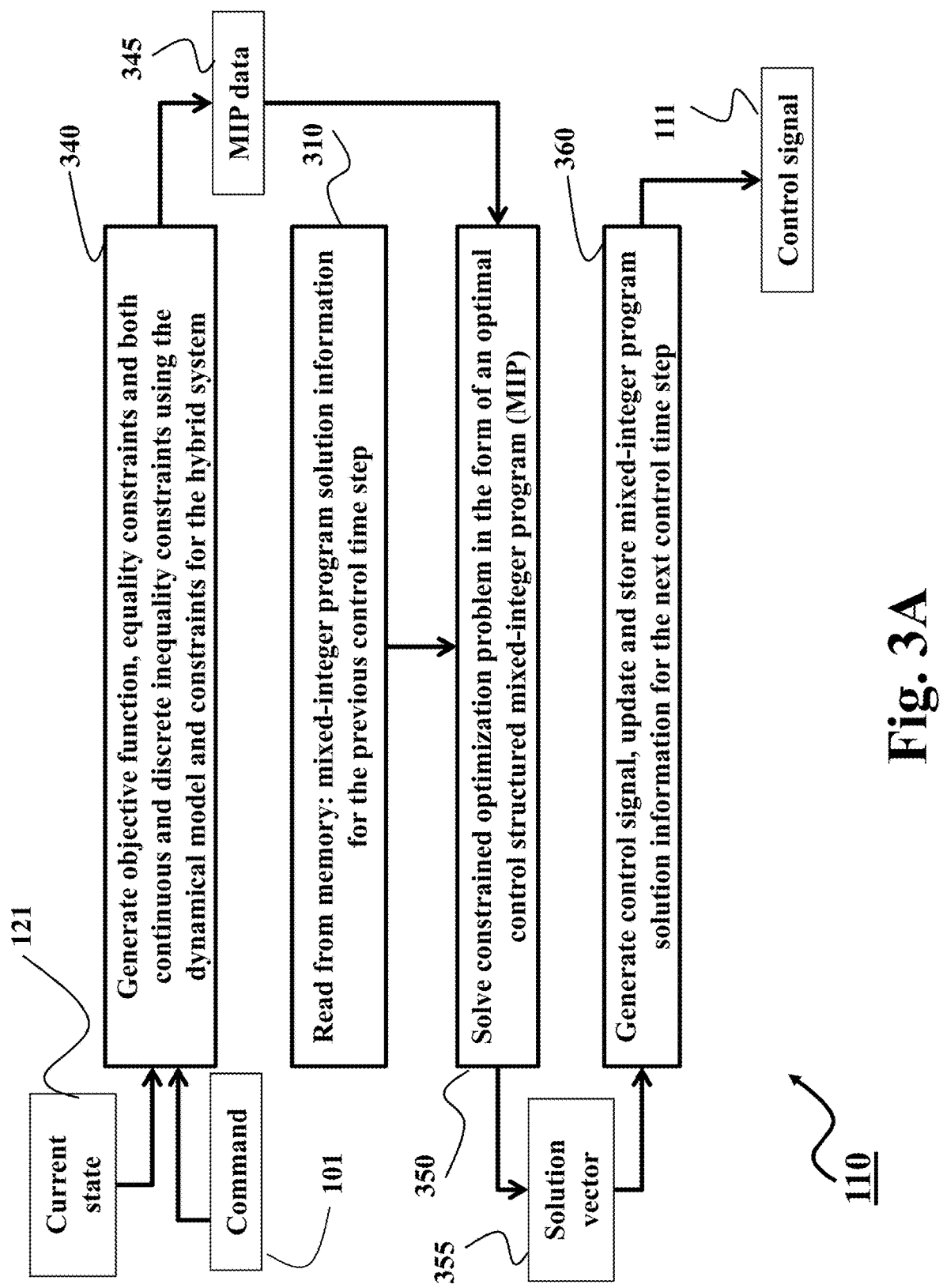
FIG. 3A is a block diagram of a mixed-integer model predictive control (MI-MPC) method to implement the hybrid control system according to some embodiments.

FIG. 3A shows a block diagram of a system and a method for mixed-integer model predictive control (MI-MPC) to implement the controller 110 that computes the control signal 111, given the current state of the system 121 and the control command 101 according to some embodiments. Specifically, MI-MPC computes a control solution, e.g., a solution vector 355, that contains a sequence of future optimal discrete and continuous control inputs over a prediction time horizon of the system 360, by solving a constrained mixed-integer optimization problem 350 at each control time step. The data 345 of the objective function, equality, and discrete and continuous inequality constraints in this optimization problem 350 depends on the dynamical model, the system constraints 340, the current state of the system 121, objectives of control and the control command 101.

In some embodiments, the solution of this inequality constrained mixed-integer optimization problem 350 uses the state and control values over the prediction time horizon from the previous control time step 310, which can be read from the memory. This concept is called warm- or hot-starting of the optimization algorithm and it can reduce the required computational effort of the MI-MPC controller in some embodiments. In a similar fashion, the corresponding solution vector 355 can be used to update and store a sequence of optimal state and control values for the next control time step 360.

In some embodiments, the mixed-integer optimization algorithm is based on a search algorithm such that the MI-MPC controller updates and stores additional mixed-integer program solution information 360 in order to reduce the computational effort of the search algorithm at the next control time step. In one embodiment, the MI-MPC problem at each control time step is solved using a branch-and-bound optimization method and the warm starting information 360 includes data related to the nodes in the binary search tree that are part of the solution path from the root node to the leaf node where the optimal integer-feasible control solution is found, in order to improve the node selection and variable branching strategies from one control time step to the next.

Figure 3B:
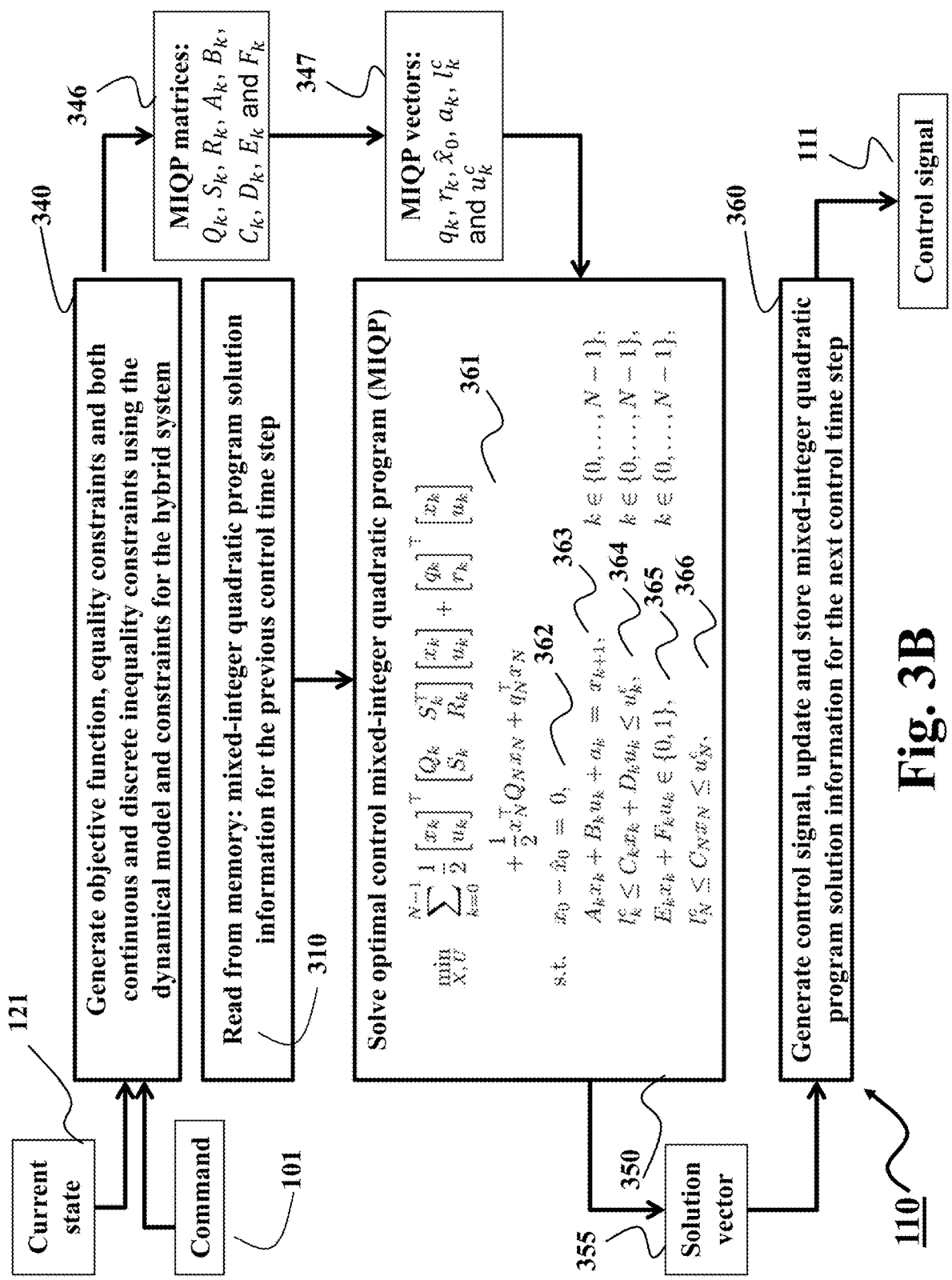
FIG. 3B is a block diagram of an MI-MPC method to implement the hybrid control system by solving an optimal control structured mixed-integer quadratic program (MI-QP) according to some embodiments.

FIG. 3B shows a block diagram of an MI-MPC controller that solves an optimal control structured mixed-integer optimization problem 350 in order to compute the signal 111 at each control time step, given the current state of the system 121 and the command 101. Some embodiments are based on a linear dynamical model of the system 363 with linear equality constraints 362, linear continuous inequality constraints 364, linear discrete equality constraints 365, linear terminal inequality constraints 366 and a linear-quadratic objective function 361, such that a constrained mixed-integer quadratic program (MIQP) 350 needs to be solved at each control time step. The MIQP data 345 then include the Hessian and constraint Jacobian matrices 346 and the corresponding gradient and constraint evaluation vectors 347. In general, the linear discrete equality constraints 365 state that a linear function of state and control values, $E_k x_k + F_k u_k$, is constrained to be equal to one of a discrete set of values. In some embodiments, the linear discrete equality constraints 365 are binary equality constraints, $E_k x_k + F_k u_k \in \{0,1\}$, for example, this formulation includes a constraint on a particular control input variable to be equal to either 0 or 1.

Figure 4:
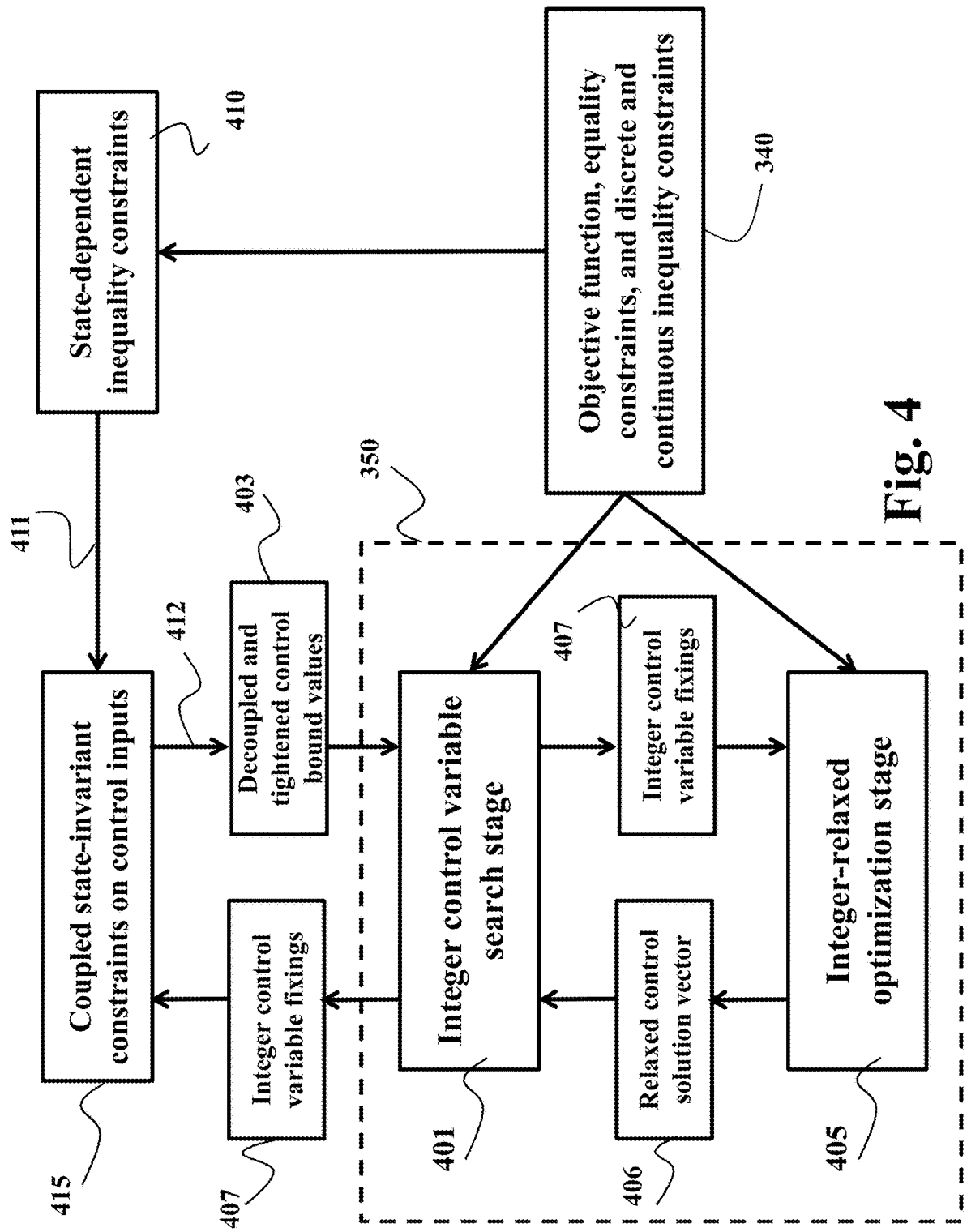
FIG. 4 is a block diagram of the interaction between the integer control variable search stage and the integer-relaxed optimization stage, and the transformation of inequality constraints to improve efficiency of the search stage.

FIG. 4 shows a block diagram of a mixed-integer optimization strategy to implement the MI-MPC controller to solve 350 MI-MPC according to some embodiments. The solution 350 is based on an integer control variable search stage 401 and an integer-relaxed optimization stage 405 according to some embodiments. The search stage 401 is concerned with finding the (close to) optimal combination of discrete values in the discrete equality constraints 365 in order to compute the MI-MPC solution vector. In some embodiments, the search stage iteratively generates a sequence of integer-relaxed MPC optimization problems 405, by relaxing the mixed-integer program into a continuous optimization problem such that the relaxed control solution vector 406 provides a lower bound for the objective value in a particular region of the discrete search space.

In some embodiments, binary equality constraints of the form $F_k u_k \in \{0,1\}$ are replaced in the integer-relaxed optimization problem 405 by continuous inequality constraints $0 \leq F_k u_k \leq 1$ or by equality constraints $F_k u_k = 0$ or $F_k u_k = 1$, depending on the current integer control variable fixings 407 that are provided by the search stage 401. In some embodiments, in order to solve the mixed-integer non-convex quadratic program 350, the integer-relaxed optimization problems are convex optimization problems such as, e.g., convex quadratic programming (QP) or semidefinite programming (SDP) problems.

Some embodiments are based on the reformulation of state-dependent inequality constraints 410, as part of the optimization problem formulation 340, into coupled state-invariant constraints on control inputs 415 that can be used to decouple and tighten 412 the control bounds 403 given the current integer control variable fixings 407 that are provided by the search stage 401. The state-dependent inequality constraints 410 can be transformed 411 into coupled state-invariant constraints on control inputs 415, based on the system dynamic equations 363 and the initial value condition 362. Some embodiments construct the decoupled and tightened control bound values 403, based on an iterative procedure that ensures that infeasibility of the decoupled and tightened control bounds 403 implies infeasibility with respect to the coupled state-invariant constraints on control inputs 415, which implies infeasibility with respect to the original inequality constraints 410. More specifically, any combination of values for the control inputs, resulting in a sequence of values for the state variables that satisfy the state constraints 410, also satisfy the coupled state-invariant control constraints 415 and the decoupled and tightened control bounds 403.

To that end, some embodiments transform 411 the state constraints 410 into coupled state-invariant control constraints 415 and decouple and tighten 412 these constraints resulting in bound values 403 on the control inputs to the system, such that any combination of values for the control inputs, resulting in a sequence of values for the state variables that satisfy the state constraints 410, also satisfy the coupled state-invariant control constraints 415 and the decoupled and tightened control bound values 403, and solve 350 the MI-MPC problem subject to the state constraints 410 and the coupled state-invariant control constraints 415.

In some embodiments, the search stage uses the decoupled and tightened control bound values 403 in order to eliminate regions of the discrete search space, because of detected infeasibility with respect to the decoupled and tightened control bounds 403 which implies infeasibility with respect to the coupled state-invariant constraints on the control inputs 415 which implies infeasibility with respect to the original state-dependent inequality constraints 410. In some embodiments, the use of the decoupled and tightened control bounds 403 allows a reduction of the computational effort of the search stage, in case one or multiple regions can be eliminated without the need to solve any integer-relaxed optimization problems in the optimization stage 405, because the solution of integer-relaxed optimization problems is more computationally expensive than the evaluation of control constraints.

Figure 5A:
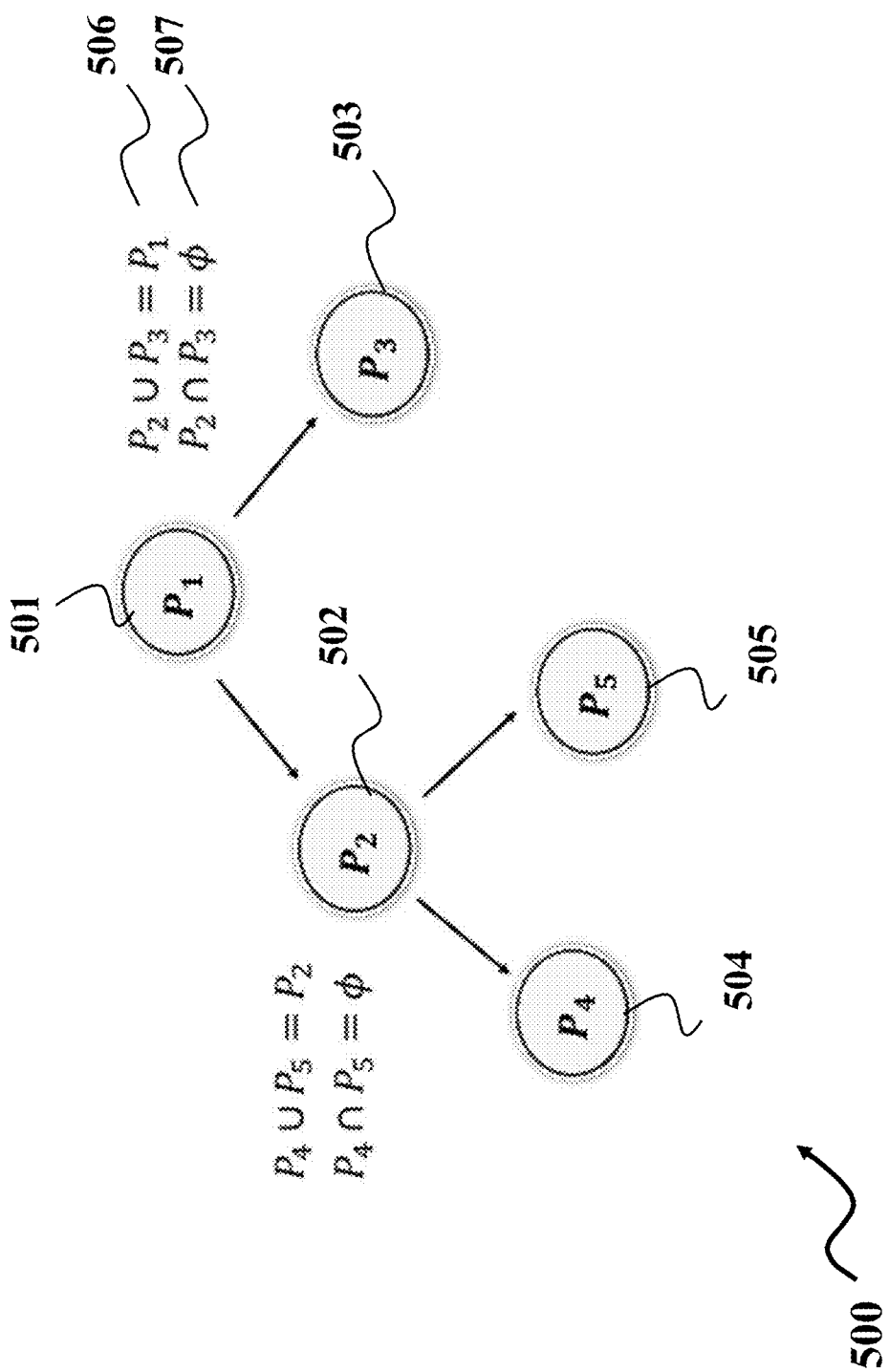
FIG. 5A is a schematic of an example of a binary control variable search tree that represents a nested tree of search regions for the integer-feasible control solution.

FIG. 5A shows a schematic representation of a branch-and-bound method, which can be used to implement the MI-MPC controller in some embodiments, by showing the binary search tree 500 at a particular iteration of the mixed-integer optimization algorithm. The main idea of a branch-and-bound method is to sequentially create partitions of the original problem and then attempt to solve those partitions, where each partition corresponds to a particular region of the discrete control variable search space. In some embodiments, a branch-and-bound method selects a partition or node and selects a discrete control variable to branch this partition into smaller partitions or search regions, resulting in a nested tree of partitions or search regions.

For example, the partition $P_1$ 501 represents a discrete search region that can be split or branched into two smaller partitions or regions $P_2$ 502 and $P_3$ 503, i.e., a first and a second region that are nested in a common region. The first and the second region are disjoint, i.e., the intersection of these regions is empty $P_2 \cap P_3 = \phi$ 507, but they form the original partition or region $P_1$ together, i.e., the union $P_2 \cup P_3 = P_1$ holds 506 after branching. The branch-and-bound method then solves an integer-relaxed MPC problem for both the first and the second partition or region of the search space, resulting in two solutions that can be compared against each other as well as against the currently known upper bound value to the optimal objective value. The first and/or the second partition or region can be pruned if their performance metric is less optimal than the currently known upper bound to the optimal objective value of the MI-MPC problem. The upper bound value can be updated if the first region, the second region or both regions result in a discrete feasible solution to the MI-MPC problem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program or by using duality. If MI-MPC solver happens to obtain an integer-feasible solution while solving a local relaxation, the MI-MPC solver can then use it to obtain a global upper bound for the mixed-integer control solution of the original MI-MPC problem. This may help to avoid solving or branching certain partitions that were already created, i.e., these partitions or nodes can be pruned. This general algorithmic idea of partitioning can be represented as a binary search tree 500, including a root node, e.g., $P_1$ 501 at the top of the tree, and leaf nodes, e.g., $P_4$ 504 and $P_5$ 505 at the bottom of the tree.

Figure 5B:
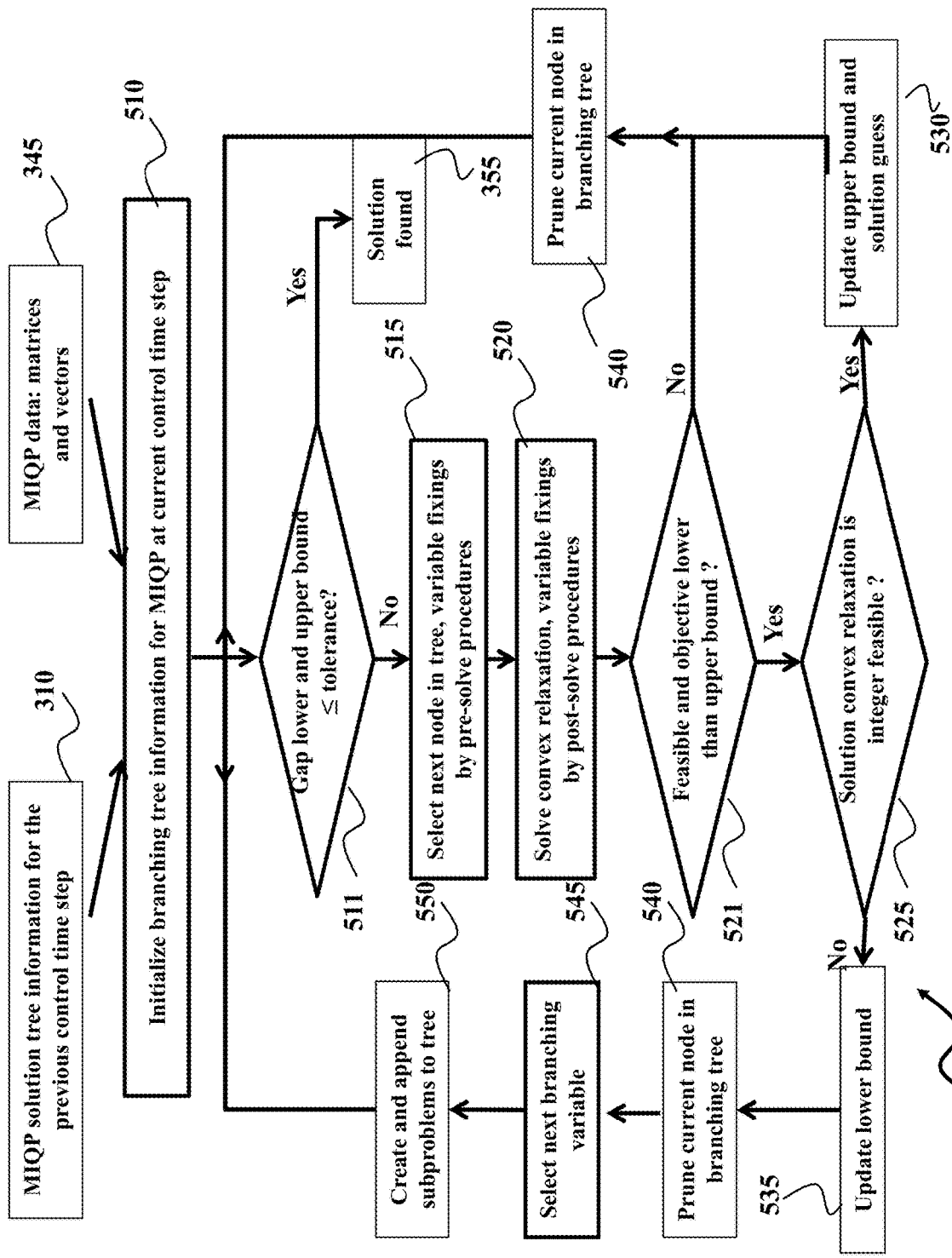
FIG. 5B is a block diagram of a branch-and-bound mixed-integer optimization algorithm to search for the integer-feasible optimal control solution based on a nested tree of search regions and corresponding lower/upper bound values.

FIG. 5B shows a block diagram and FIG. 5C shows pseudo code of a branch-and-bound optimization algorithm, which can be used to implement the MI-MPC controller in some embodiments. The branch-and-bound method initializes the branching search tree information for the mixed-integer quadratic program (MIQP) at the current control time step 510, based on the MIQP data 345 that consists of MIQP matrices 346 and MIQP vectors 347. The initialization can additionally use the branching search tree information and MIQP solution information from the previous control time step 310 in order to generate a warm started initialization for the current control time step 510. The main goal of the optimization algorithm is to construct lower and upper bounds on the objective value of the mixed-integer control solution. If the gap between the lower and upper bound value is smaller than a particular tolerance value 511, then the mixed-integer optimal control solution is found 355.

As long as the gap between the lower and upper bound value is larger than a particular tolerance value 511, and a maximum execution time is not yet reached by the optimization algorithm, then the branch-and-bound method continues to search iteratively for the mixed-integer optimal control solution 355. Each iteration of the branch-and-bound method starts by selecting the next node in the tree, corresponding to the next region or partition of the integer variable search space, with possible variable fixings based on pre-solve branching techniques 515. After the node selection, the corresponding integer-relaxed MPC problem is solved, with possible variable fixings based on post-solve branching techniques 520.

If the integer-relaxed MPC problem has a feasible solution, then the resulting relaxed control solution provides a lower bound on the objective value for that particular region or partition of the integer variable search space. In case that this lower bound is larger than the currently known upper bound for the objective value of the optimal mixed-integer control solution 521, then the selected node is pruned or removed from the branching tree 540. If the objective is lower than the currently known upper bound 521, and the relaxed control solution is integer feasible 525, then the currently known upper bound and corresponding mixed-integer control solution guess needs to be updated 530.

If the integer-relaxed MPC problem has a feasible solution and the objective is lower than the currently known upper bound 521, but the relaxed control solution is not yet integer feasible, then the global lower bound for the objective can be updated 535 to be the minimum of the objective values for the existing nodes in the branching tree and the selected node is pruned from the tree 540. In addition, starting from the current node, a discrete variable with a fractional value is selected for branching according to a particular branching strategy 545, in order to append the resulting subproblems, corresponding to regions or partitions of the discrete search space, as children of that node in the branching tree 550.

An important step in the branch-and-bound method is how to create the partitions, i.e., which node to select 515 and which discrete variable to select for branching 545. Some embodiments of the invention are based on branching one of the binary control variables with fractional values in the integer-relaxed MPC solution. For example, if a particular binary control variable $u_{i,k} \in \{0,1\}$ has a fractional value as part of the integer-relaxed MPC solution, then some embodiments create two partitions of the mixed-integer program by adding, respectively, the equality constraint $u_{i,k}=0$ to one subproblem and the equality constraint $u_{i,k}=1$ to the other subproblem. Some embodiments of the invention are based on a reliability branching strategy for variable selection, which aims to predict the future branching behavior based on information from previous branching decisions as will be explained in more detail further as part of the description for FIG. 8.

Some embodiments of the invention are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments of the invention are based on a branch-and-bound method that uses a best-first strategy that selects the node with the currently lowest local lower bound. Some embodiments of the invention employ a combination of the depth-first and best-first node selection approach, in which the depth-first node selection strategy is used until an integer-feasible control solution is found, followed by using the best-first node selection strategy in the subsequent iterations of the branch-and-bound based optimization algorithm. The latter implementation is motivated by aiming to find an integer-feasible control solution early at the start of the branch-and-bound procedure (depth-first) to allow for early pruning, followed by a more greedy search for better feasible solutions (best-first).

The branch-and-bound method continues iterating until either one or multiple of termination conditions are satisfied. The termination conditions include the maximum execution time for the processor is reached, all the nodes in the branching search tree have been pruned, such that no new node can be selected for solving convex relaxations or branching, and the optimality gap between the global lower and upper bound value for the objective of the mixed-integer control solution is smaller than the tolerance.

Figure 6A:
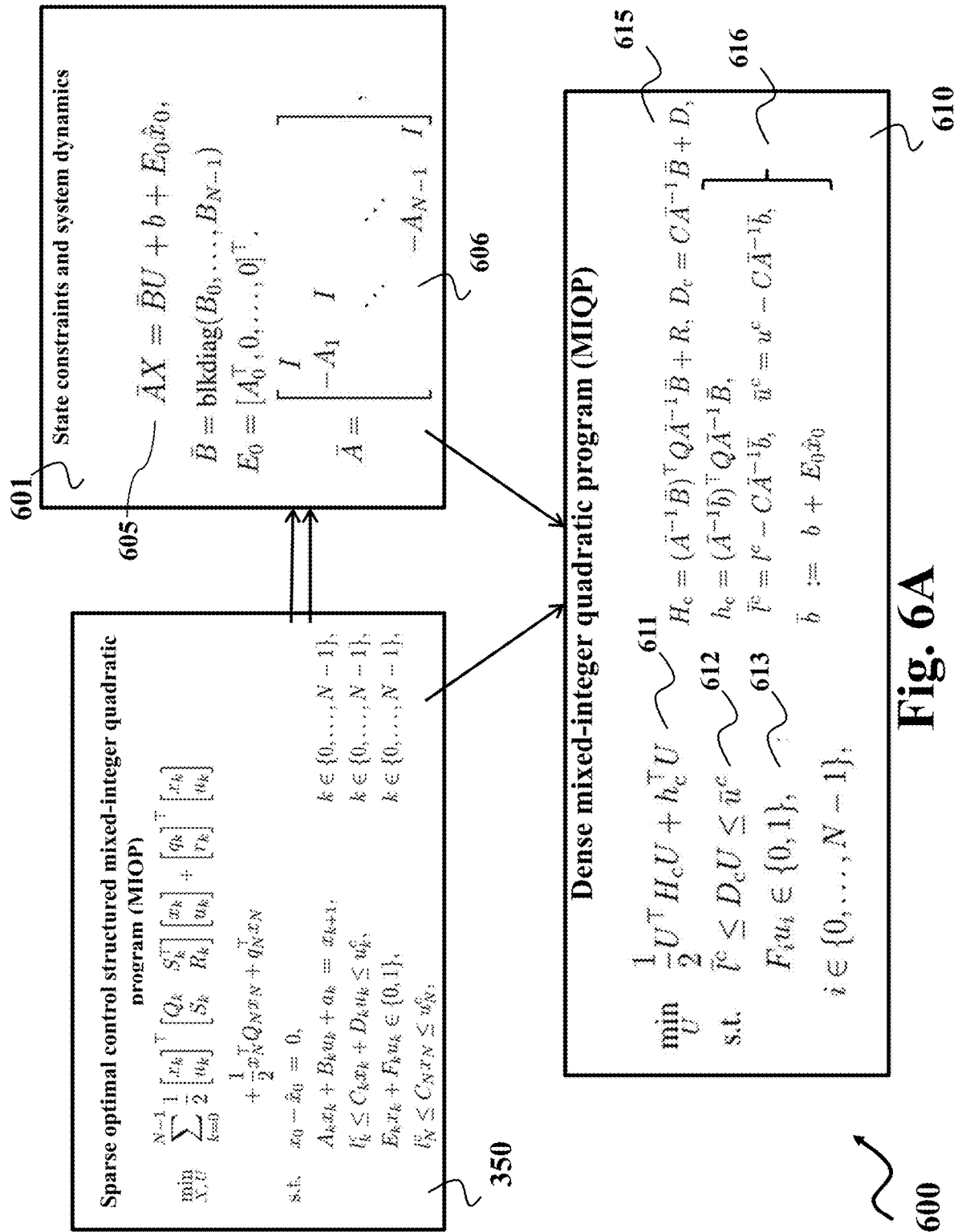
FIG. 6A is a block diagram of a numerical condensing method that computes a dense mixed-integer quadratic program (MIQP), given the block-sparse optimal control structured problem formulation.

FIG. 6A shows a condensing method 600 used by some embodiments to reformulate the block-sparse optimal control structured mixed-integer quadratic program (MIQP) 350, involving both state and control input variables at each stage of the MPC control horizon, into an equivalent but dense formulation of the MIQP 610 that depends only on the control input variables at each stage of the MPC control horizon. Some embodiments perform this condensing procedure once for each MIQP solution based on the branch-and-bound method. In some embodiments, if the MIQP matrices 346 do not change from one MI-MPC control time step to the next, the condensed MIQP matrices 615 do not change at each control time step and can therefore be computed offline. The condensed MIQP vectors 616 are computed online at each control time step according to the change in the MIQP vectors 347, e.g., a change in the initial state value, the constraint values or in the objective, in some embodiments.

The numerical condensing method 600 is based on the use of the system dynamics in order to eliminate the state variables from the MIQP problem formulation 601. The state constraints can be written more compactly as $\overline{A}X = \overline{B}U + b + E_0\hat{x}_0$ 605, where the matrices are defined 606 in order to match the continuity conditions of the sparse mixed-integer optimal control problem 362-363. The matrix $\overline{A}$ 606 is invertible such that the state variables can be defined as $X = \overline{A}^{-1}(\overline{B}U + b + E_0\hat{x}_0)$, which can be used to construct the dense MIQP 610, including the condensed quadratic objective 611, the condensed and coupled affine inequality constraints 612 and the discrete control variable constraints 613, based on the condensed MIQP matrices 615 and the condensed MIQP vectors 616.

Some embodiments are based on solving either the block-sparse optimal control structured 350 or the condensed formulation 610 of the optimization problem, when solving the convex relaxations 520 in the branch-and-bound method.

Similarly, either the block-sparse optimal control structured 350 or the condensed formulation 610 of the optimization problem can be used in the pre- and post-solve branching techniques in embodiments of the invention. Some embodiments of the invention solve convex relaxations 520 of the block-sparse optimal control structured problem 350 in order to be able to use tailored convex QP solvers that exploit the block-sparse optimal control structure such as, e.g., in the software PRESAS, HPMPC, HPIPM, FORCES, or qpDUNES. Some embodiments use the condensed formulation of the optimization problem instead for pre- or post-solve branching techniques such as, e.g., for the domain propagation method.

Some embodiments of the invention are based on an optimization algorithm to solve the Karush-Kuhn-Tucker (KKT) optimality conditions for the integer-relaxed convex MPC problem 520 in each iteration of the branch-and-bound method. Examples of such optimization algorithms include gradient-based methods, splitting methods, active-set methods or interior point methods.

Figure 6B:
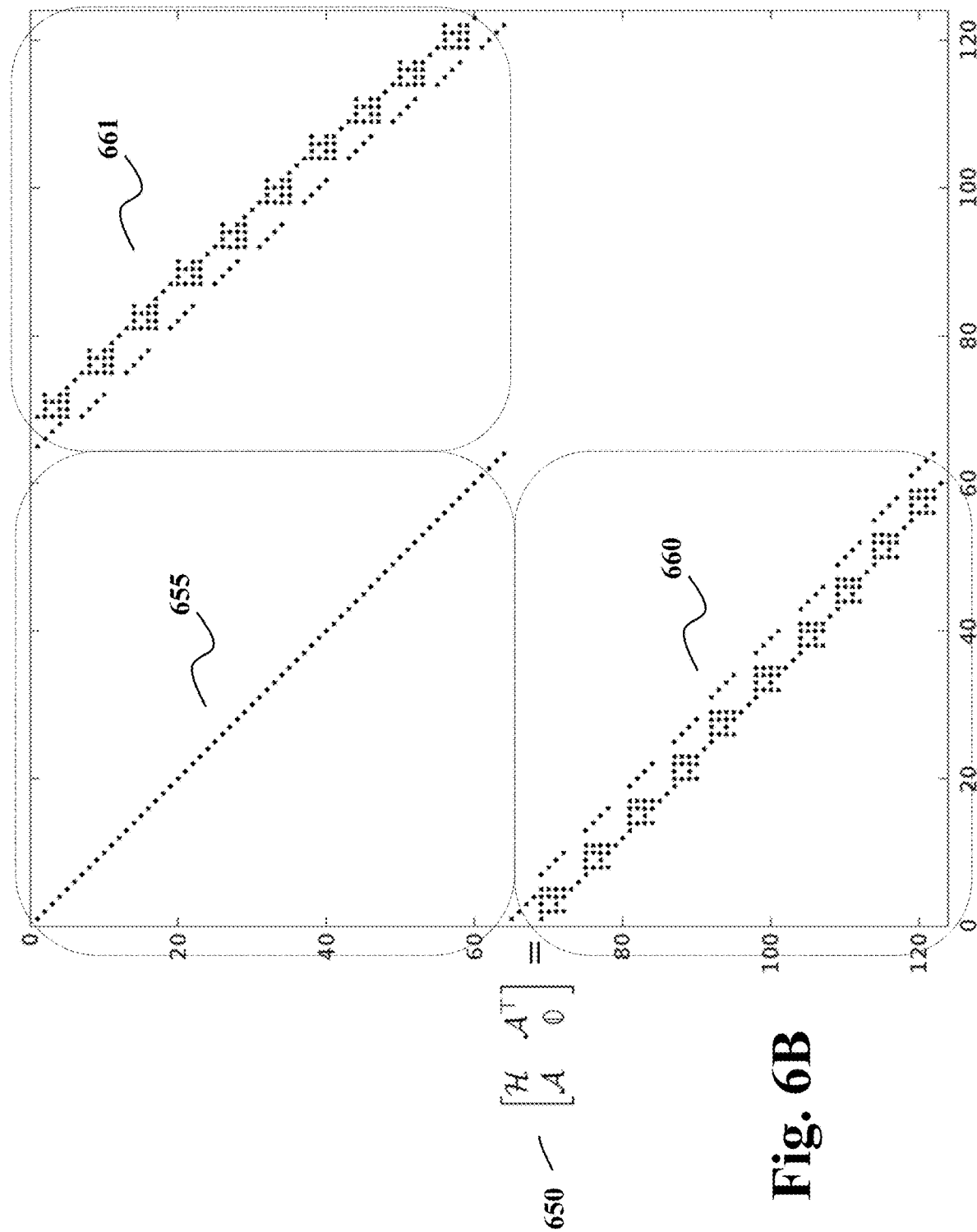
FIG. 6B is a schematic that shows an example of the block-sparse optimal control structured system of optimality conditions for an integer-relaxed MPC solution.

FIG. 6B shows a schematic of a sparsity structure for the KKT matrix 650 in the saddle point linear system that needs to be solved as part of a second order optimization algorithm that can be used by some embodiments of the invention to solve the convex relaxations of the mixed-integer MPC problem. In some embodiments, the block-diagonal Hessian matrix simplifies into a diagonal Hessian matrix 655 when each of the Hessian block matrices is diagonal, which can typically reduce the required computational effort to solve the corresponding saddle point linear KKT system. In addition, the constraint Jacobian matrix 660 and its transpose 661 in the KKT matrix show a typical optimal control block-sparsity structure that is exploited in the efficient solution of each saddle point linear KKT system, typically resulting in a linear scaling of the computational effort with the number of intervals in the MPC control horizon, according to some embodiments of this invention.

Pre-solve branching techniques are often crucial in making the convex relaxations tighter such that typically less nodes or regions need to be explored in the branch-and-bound method, according to some embodiments of the invention.

Figure 7A:
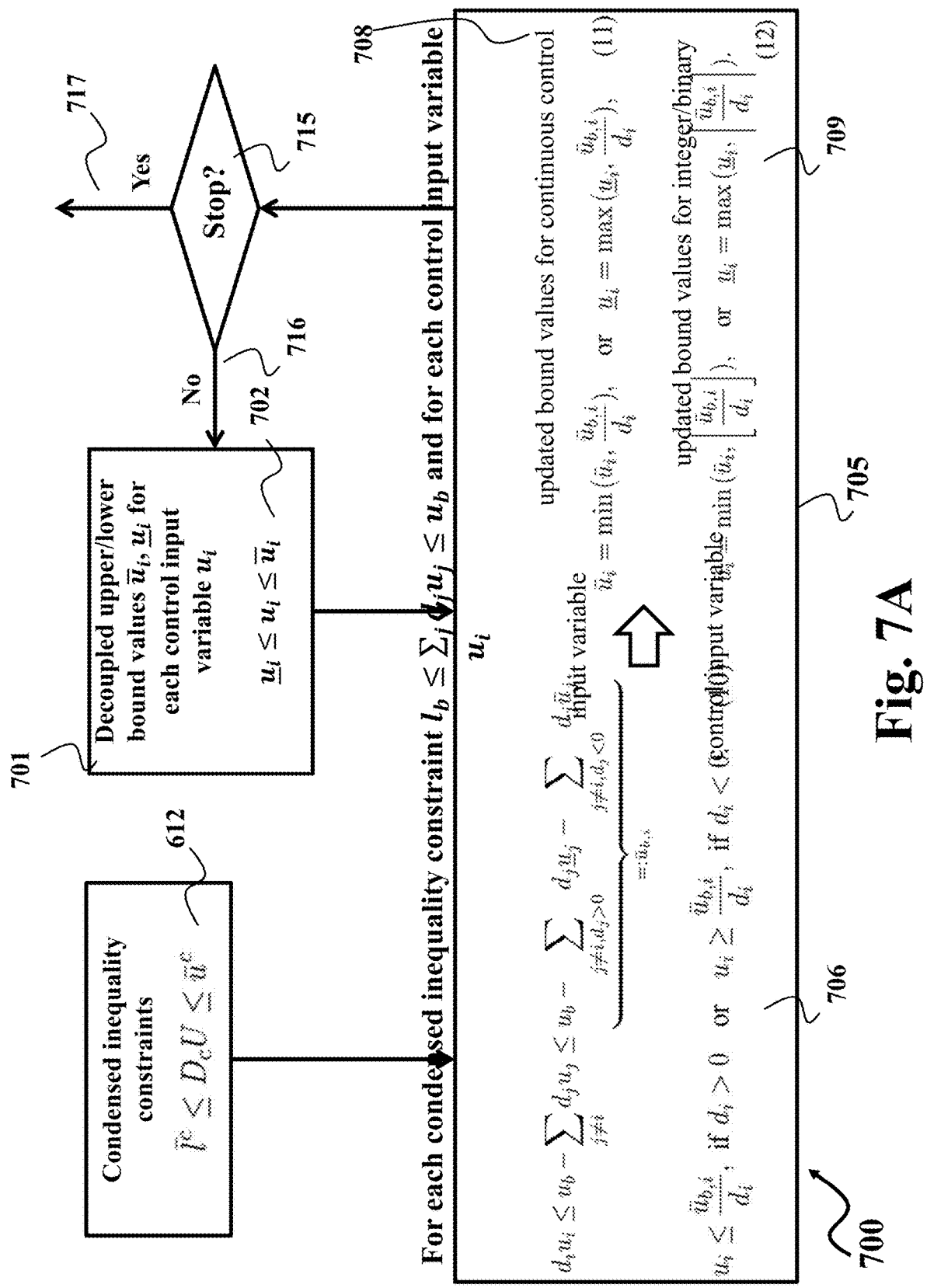
FIG. 7A is a block diagram of a bound strengthening method that computes decoupled and tight state-invariant control input constraints based on domain propagation for a given set of state-dependent inequality constraints.

FIG. 7A shows a block diagram and FIG. 7B shows pseudo code of a domain propagation method 700, that is tailored by some embodiments to the solution of the mixed-integer constrained optimal control problem 350, by exploiting the equivalent but condensed problem formulation 610 and, more specifically, the coupled affine inequality constraints 612 in combination with the discrete control variable constraints 613. The goal of the domain propagation method 700, given an initial set of control bounds $\underline{u}_i \leq u_i \leq \overline{u}_i$ for each of the control input variables, is to strengthen or tighten these control bounds by computing new bound values $\overline{u}_i^+$ and $\underline{u}_i^+$ such that $\underline{u}_i \leq \underline{u}_i^+ \leq u_i \leq \overline{u}_i^+ \leq \overline{u}_i$ 403, based on the coupled inequality constraints $\underline{l}^c \leq D_c U \leq \overline{u}^c$ 612, the discrete control variable constraints 613 and the discrete control variable fixings 407. For example, if a particular discrete control variable $u_{i,k} \in \{0,1\}$ is fixed to be equal to $u_{i,k}=1$, then the corresponding control bound values read as $\underline{u}_{i,k}=1$ and $\overline{u}_{i,k}=1$, and this information can be used by the domain propagation method 700 to strengthen or tighten control bound values for other control input variables.

Some embodiments are based on recognition that the results of a domain propagation method would be rather weak when applied directly to the block-sparse optimal control problem formulation 350, using the inequality constraints 364, the discrete control variable constraints 365 and the terminal inequality constraints 366. Some embodiments are based on the realization that the initial state value condition 362 and the system dynamic constraints 363 need to additionally be taken into account. Some embodiments therefore apply the domain propagation based bound strengthening to the condensed problem formulation 610, which can be computed either offline or online for the MIQP at each control time step, and, more specifically, the domain propagation method uses the coupled affine inequality constraints 612 in combination with the discrete control variable constraints 613 and the discrete control variable fixings 407.

Given an initial set of decoupled control bounds $\underline{u}_i \leq u_i \leq \overline{u}_i$ 702 for each of the individual control input variables 701, each iteration of the domain propagation method then uses each of the coupled inequality constraints $\underline{l}^c \leq D_c U \leq \overline{u}^c$ 612 in order to try and tighten the bound values $\underline{u}_i$ and $\overline{u}_i$ for each of the control input variables 705. In order to do that, some embodiments decouple the state-invariant control constraints to form the search space. In effect, the decoupling of the coupled inequality constraints allows to preserve sparsity of the MPC problem while reducing the search space.

Let us consider a particular coupled inequality constraint of the form $l_b \leq \Sigma_j d_j u_j \leq u_b$ that can be used to compute new bound values $\overline{u}_i^+$ and $\underline{u}_i^+$ for the control input variable $\underline{u}_i \leq u_i \leq \overline{u}_i$, if $d_i \neq 0$, as follows $$d_i u_i \leq u_b - \sum_{j \neq i} d_j u_j \leq u_b - \sum_{j \neq i, d_j > 0} d_j \underline{u}_j - \sum_{j \neq i, d_j < 0} d_j \overline{u}_j \leq \overline{u}_{b,i}$$

where $\overline{u}_{b,i} = u_b - \Sigma_{j \neq i, d_j > 0} d_j \underline{u}_j$ has been defined, and the current decoupled control bound values $\underline{u}_j \leq u_j \leq \overline{u}_j$ 702 for all control input variables $u_j$, $j \neq i$ have been used. A similar reformulation can be performed for the coupled inequality constraint $$d_i u_i \geq l_b - \sum_{j \neq i} d_j u_j \geq l_b - \sum_{j \neq i, d_j > 0} d_j \overline{u}_j - \sum_{j \neq i, d_j < 0} d_j \underline{u}_j \geq \underline{l}_{b,i}$$

where $\underline{l}_{b,i} = l_b - \Sigma_{j \neq i, d_j > 0} d_j \overline{u}_j - \Sigma_{j \neq i, d_j < 0} d_j \underline{u}_j$ has been defined.

Based on both of these decoupled inequality constraints 706, one can compute the updated lower and upper bound values for the control input variable $$\underline{u}_i = \max\left(\underline{u}_i, \frac{\underline{l}_{b,i}}{d_i}\right), \overline{u}_i = \min\left(\overline{u}_i, \frac{\overline{u}_{b,i}}{d_i}\right)$$

if $d_i > 0$, or as follows $$\underline{u}_i = \max\left(\underline{u}_i, \frac{\overline{u}_{b,i}}{d_i}\right), \overline{u}_i = \min\left(\overline{u}_i, \frac{\underline{l}_{b,i}}{d_i}\right)$$

if $d_i < 0$. In addition, the above updates of the continuous bound values 708 can be further strengthened in case the control input variable $u_i$ is a binary or integer control input variable 709 as follows $$\underline{u}_i = \max\left(\underline{u}_i, \left\lceil \frac{\underline{l}_{b,i}}{d_i} \right\rceil\right), \overline{u}_i = \min\left(\overline{u}_i, \left\lfloor \frac{\overline{u}_{b,i}}{d_i} \right\rfloor\right)$$

if $d_i>0$, or as follows $$\underline{u}_i = \max\left(\underline{u}_i, \left\lceil \frac{\overline{u}_{b,i}}{d_i} \right\rceil\right), \overline{u}_i = \min\left(\overline{u}_i, \left\lfloor \frac{\overline{l}_{b,i}}{d_i} \right\rfloor\right)$$

if $d_i<0$.

In some embodiments, the decoupling is performed with a domain propagation method that iteratively tightens a set of conservative bound values for each of the control inputs. The domain propagation method constructs the decoupled state-invariant control constraints, given an initial set of control bound values as well as the state-invariant control constraints that are coupled with each other for some or all time instances of a control horizon of the MPC problem. In effect, the domain propagation method ensures the tightening of the search space for the given discrete control variables and constraints.

Each step of the domain propagation method 705 can potentially result in strengthening of bound values for either continuous or integer/binary control input variables or both. The procedure can be executed for each control input variable and for each coupled affine inequality constraint in an iterative manner, until a particular stopping criterion has been satisfied 715, since bound strengthening for one variable can lead to strengthening of the bound values for one or multiple other variables. Some embodiments of the invention perform the domain propagation method until the bound values do not sufficiently change or a certain limit on the computation time or the number of iterations has been met 715. If the stopping criterion is not satisfied 716, the domain propagation method continues but, if the stopping criterion has been satisfied 717, then the branch-and-bound method continues with the updated control bound values 403.

Some embodiments are based on the realization that the domain propagation method 700 can lead to considerable reductions in the amount of explored regions of the integer control variable search space. Some embodiments reduce the amount of explored regions, after performing the domain propagation method 700, based on infeasibility detection whenever $\overline{u}_i < \underline{u}_i$ for a particular partition or region in the search tree, and all its subpartitions or subregions, without the need to solve any relaxed MPC problems. Some embodiments of the invention reduce the amount of explored regions, after performing the domain propagation method 700, based on variable fixings whenever a discrete control variable has equal lower and upper bound values such that $u_i = \overline{u}_i = \underline{u}_i$ for a particular partition or node in the search tree, and all its subpartitions or subregions, without the need to solve any relaxed MPC problems.

In addition, some embodiments use the domain propagation method 700, in order to compute the feasibility impact of proposed optimality-based discrete control variable fixings. For example, a particular optimality-based discrete control variable fixing $u_{i,k}=0$ or $u_{i,k}=1$ is performed if and only if this fixing does not induce additional control variable fixings by performing the domain propagation method 700, based on the coupled inequality constraints $\underline{l}^c \leq D_c U \leq \overline{u}^c$ 612, the discrete control variable constraints 613 and all discrete control variable fixings 407. For example, one embodiment uses the condensed Hessian matrix 615 in order to compute optimality-based discrete control variable fixings by guaranteeing, for example, that a particular variable fixing $u_{i,k}=0$ is always more optimal than $u_{i,k}=1$ or vice versa, regardless of the values for the other optimization variables.

FIG. 8 shows pseudo code for a reliability based branching strategy that is used in some embodiments in order to select the next discrete variable to be branched in a particular partition or region of the discrete search space as part of a branch-and-bound optimization. The idea of reliability branching 800 is to combine two concepts for variable selection: strong branching and pseudo-cost information for each discrete control variable. Strong branching relies on temporarily branching, both up (to higher integer) and down (to lower integer), for every discrete control variable that has a fractional value in the solution of a convex relaxation in a given node 801, before committing to the discrete variable that provides the highest value for a particular score function 816. For example, the increase in objective values $\Delta_{i,k}^+$, $\Delta_{i,k}^-$ are computed when branching the binary variable $u_{i,k}$, respectively, up $u_{i,k}=1$ and down $u_{i,k}=0$. Some embodiments of the invention compute a scoring function based on the product $$S_{i,k}=\text{score}(\Delta_{i,k}^+,\Delta_{i,k}^-)=\max(\Delta_{i,k}^+,\in)*\max(\Delta_{i,k}^-,\in)$$

given a small positive value $\in>0$. Note that any other scoring function, depending on the strongly branched control solutions, can be used for each candidate discrete control variable 803 in a given partition or region of the discrete search space.

Some embodiments are based on the realization that the strong branching procedure can be computationally expensive since several convex relaxations are solved in order to select one discrete variable to branch on. Instead, the reliability branching strategy 800 maintains pseudo-cost information for each discrete control variable in order to approximate the increase in objective values $\Delta_{i,k}^+$, $\Delta_{i,k}^-$ when branching the binary variable $u_{i,k}$, respectively, up $u_{i,k}=1$ and down $u_{i,k}=0$, without the need to solve any additional convex relaxations. In some embodiments of the invention, the pseudo-cost information represents the average increase in the objective value per unit change in that particular discrete variable when branching, respectively, up (to higher integer) and down (to lower integer).

More specifically, each discrete control variable $u_{i,k}$ has two pseudo-costs, $\phi_{i,k}^+$ and $\phi_{i,k}^-$ that represent the average increase in the objective value per unit change in that particular discrete variable when branching, respectively, up (to higher integer) and down (to lower integer). Whenever that particular discrete variable is branched on in an iteration of the branch-and-bound optimization algorithm, and the resulting convex relaxation has a feasible control solution, some embodiments of the invention then update each corresponding pseudo-cost with the observed increase in the objective, divided by the distance of the real to the discrete value, in the form of a cumulative average. The reliability branching strategy 800 keeps track of the number of times that a particular discrete control variable $u_{i,k}$ has been branched on as part of the branch-and-bound optimization algorithm, i.e., the number #branch($u_{i,k}$) can be used to represent the confidence level for the pseudo-cost information $\phi_{i,k}^+$ and/or $\phi_{i,k}^-$.

Some embodiments then use the pseudo-costs for each candidate discrete control variable 803 if and only if #branch($u_{i,k}$)>$\eta_{rel}$, where $\eta_{rel}$ represents the reliability threshold value, in order to approximate the increase in objective values $\Delta_{i,k}^+$, $\Delta_{i,k}^-$.

$$\Delta_{i,k}^+ \approx (1-\overline{u}_{i,k})\phi_{i,k}^+, \Delta_{i,k}^- \approx \overline{u}_{i,k}\phi_{i,k}^-$$

where $\overline{u}_{i,k}$ represents the current fractional value of the candidate discrete control variable in a given partition or region of the discrete search space. These approximations for the increase in objective values are then used to compute a particular score function 815 such as, for example, $$S_{i,k} = \text{score}((1-\bar{u}_{i,k})\phi_{i,k}^+, \bar{u}_{i,k}\phi_{i,k}^-)$$
$$= \max((1-\bar{u}_{i,k})\phi_{i,k}^+, \epsilon) * \max(\bar{u}_{i,k}\phi_{i,k}^-, \epsilon)$$

Instead, if #branch($u_{i,k}$)≤$\eta_{rel}$, i.e., if the discrete control variable $u_{i,k}$ has insufficiently been branched on throughout the branch-and-bound method, then strong branching is used to compute the value of the score function $S_{i,k}$ 805, and the corresponding pseudo-costs $\phi_{i,k}^+$ and $\phi_{i,k}^-$ can be updated 810. Given these values for the particular score function, the reliability branching strategy 800 selects the discrete variable from the set of candidate variables 803, that provides the highest value for a particular score function 816.

Some embodiments select variables based on their past branching behavior throughout the branch-and-bound search algorithm. For example, some embodiments perform mostly strong branching, e.g., if the reliability threshold value $\eta_{rel}$ is chosen to be very large. Some embodiments initialize the pseudo-costs at the start of the branch-and-bound method but then switch to pseudo-cost branching, i.e., if the reliability threshold value is equal to $\eta_{rel}=0$. Alternative embodiments, instead, use a reliability threshold value that lies in between, e.g., 1≤$\eta_{rel}$≤4.

Some embodiments do not consider all possible discrete control variables that have a fractional value in the relaxed solution as part of the set of candidate variables 803 for branching, but instead they select a limited number of most promising discrete candidate variables. Other embodiments perform a limited number of iterations of a convex optimization algorithm in order to implement the strong branching 805 as part of the branching strategy. Note that embodiments can also be implemented based on other branching strategies such as, for example, infeasibility based branching that selects the binary variable with a fractional part that is closest to the value 0.5.

Figure 9A:
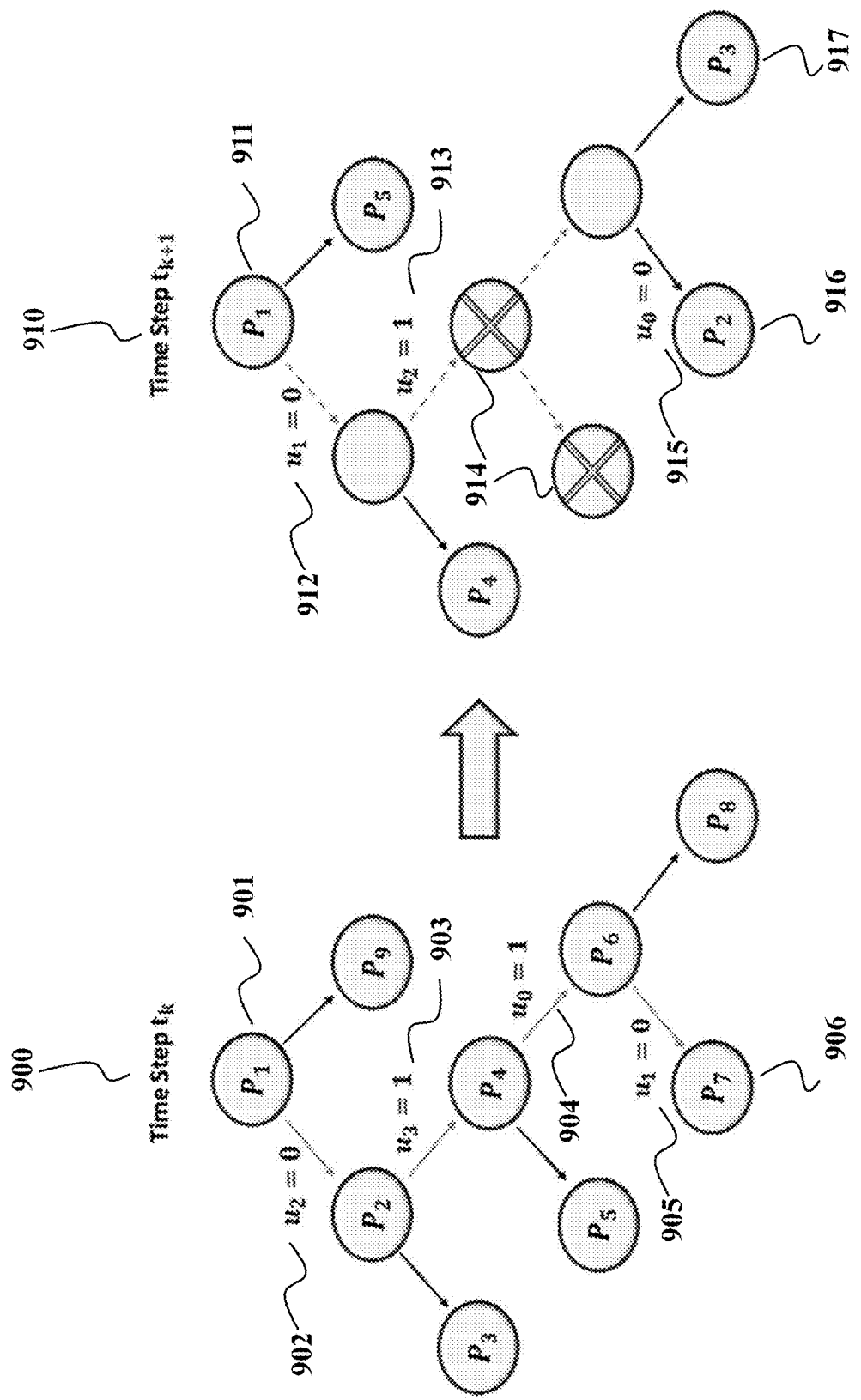
FIG. 9A is a schematic of a tree propagation-based warm starting strategy for the binary control variable search tree from one control time step to the next.

FIG. 9A shows a schematic and FIG. 9B shows pseudo code of a tree propagation method 930 that is used in some embodiments in order to warm start the branch-and-bound method, used to implement the mixed-integer model predictive controller 110. The predictive controller solves 350 a mixed-integer program at each control time step, under strict timing constraints and potentially on embedded control hardware 201 with limited computational capabilities and limited available memory 202. Some embodiments of the invention are based on the realization that MI-MPC solves a sequence of strongly related mixed-integer parametric optimization problems, e.g., parameterized by the initial state value $\hat{x}_0$ 362, such that solution information from one control time step can be used to reduce the computational effort at the next control time step in the form of a warm starting strategy for the branch-and-bound method. More specifically, in case of a branch-and-bound optimization algorithm, some embodiments perform a tree propagation method 930 that reuses information from the binary search tree and information related to the mixed-integer solution path from one control time step to the next.

The tree propagation method 930 stores the solution path from the root to the leaf node where the mixed-integer optimal control solution was found, as well as the branching order of the variables and the relaxed control solutions on the path. More specifically, in the schematic of FIG. 9A, the solution path at time step $t_k$ 900 starts at the root node $P_1$ 901, to the child node $P_2$ by branching on the variable $u_2=0$ 902, then to the child node $P_4$ by branching on the variable $u_3=1$ 903, then to the child node $P_6$ by branching on the variable $u_0=1$ 904, and finally to the leaf node $P_7$ 906, where the mixed-integer optimal control solution was found, by branching on the discrete variable $u_1=0$ 905. Therefore, the sequence of partitions and branching decisions read as $$P_1 \xrightarrow{u_2=0} P_2 \xrightarrow{u_3=1} P_4 \xrightarrow{u_0=1} P_6 \xrightarrow{u_1=0} P_7$$

Given the optimal solution path at the current time step $t_k$ 900, the tree propagation method 930 shifts the index of the branched variables by one stage along this path in order to compute a warm started guess for the mixed-integer solution path at the next control time step $t_{k+1}$ 910. Given the ordered list of the branched variables, e.g., $u_2, u_3, u_0, u_1$ at the time step $t_k$ 900, the shifted list of branched variables could then read, e.g., as $u_1, u_2, u_{-1}, u_0$ at the time step $t_{k+1}$ 910, if there is only one control variable for each stage in the MPC control horizon. In general, the tree propagation method shifts the index of all the branched variables on the solution path by one stage in the MPC control horizon 920.

At the subsequent time step $t_{k+1}$ 910, after obtaining the new state estimate value $\hat{x}_0$ 362, we execute all pre-solve branching techniques, such as the domain propagation method 700, and we solve the convex relaxation corresponding to the new root node 911 in the warm started binary search tree. The tree propagation method then removes, from the shifted list of branched variables, all variables on the stage −1, i.e., all the variables that fall outside of the MPC control horizon as a consequence of the shifting by one stage in the warm starting procedure. Some embodiments of the invention additionally remove all branched variables 914 that are integer feasible in the relaxed solution at the root node, all variables without pseudo-costs or variables that have insufficiently been branched on 925.

Given the updated list of branched variables, some embodiments update additionally the branching order based on the values of a particular score function 927, that is computed using warm-started pseudo-cost information and/or strong branching in the form of a reliability based branching strategy 800. Given the updated and potentially reordered list of branched variables, the tree propagation method 930 creates the nodes along the warm started tree 928, excluding parent nodes, i.e., excluding any nodes that have children, resulting in a warm started and ordered list L of nodes 929 for which the convex relaxation still needs to be solved. Note that the convex relaxation of a parent node never needs to be solved, if the convex relaxation is solved for all of its direct children.

For example, in the schematic of FIG. 9A, the tree propagation method removes two nodes in the warm started tree 914, because the corresponding branched variable falls outside of the MPC control horizon as a consequence of the shifting by one stage in the warm starting procedure. The shifted guess for the solution path at the next control time step $t_{k+1}$ 910, starts at the root node $P_1$ 911, it branches on the discrete variable $u_1$ to create node $P_5$ 912, it branches on the variable $u_2$ to create node $P_4$ 913 and it branches on the variable $u_0$ 915 to create the leaf nodes $P_2$ 916 and $P_3$ 917. Therefore, in this case, the warm started and ordered list L of nodes 929, after tree propagation, reads as L={$P_1, P_2, P_3, P_4, P_5$}.

Some embodiments of store, shift and reuse the relaxed MPC solutions on the warm started path in order to warm start the convex solver 926. In addition, some embodiments of store, shift and reuse the pseudo-cost information for the discrete variables from one control time step to the next, in order to reduce the amount of explored regions and/or to reduce the amount of strong branching that needs to be performed by the branch-and-bound method.

In some embodiments, the propagation of pseudo-costs can be coupled with an update of the reliability parameters to account for the aging of the branching information and therefore aim to improve the overall performance. For example, the reliability number could be reduced for each variable from one time step to the next, in order to force strong branching for variables that have not been branched on by the controller in a sufficiently long time.

FIG. 9C shows pseudo code for an MI-MPC implementation of the predictive controller 110, according to some embodiments, based on a warm-started branch-and-bound method with tree propagation and pseudo cost propagation. Given the warm-started solution information from the previous control time step 310, the MI-MPC algorithm starts by updating the condensed mixed-integer program information given the new parameter values 610 such as, e.g., the new initial state value $\hat{x}_0$ 362. The controller proceeds by solving the MIP or MIQP problem using a warm-started branch-and-bound optimization algorithm 350, in order to apply the new optimal control input value $u_0^*$ 111 to the controlled system 120. Finally, the propagation step performs warm starting and shifting of the pseudo-cost information 935, followed by the tree propagation method to generate a warm-started list of nodes for the next control time step 930.

Some embodiments are based on the realization that the MI-MPC controller needs to compute the next control solution under strict timing constraints and that the proposed warm-starting strategies often allow one to obtain an integer-feasible solution in a computationally efficient manner. Therefore, some embodiments use a maximum number of branch-and-bound iterations in order to meet strict timing requirements of the embedded control application. Even if the algorithm does not terminate within this specified number of iterations, a feasible or even optimal solution may be available.

Figure 10:
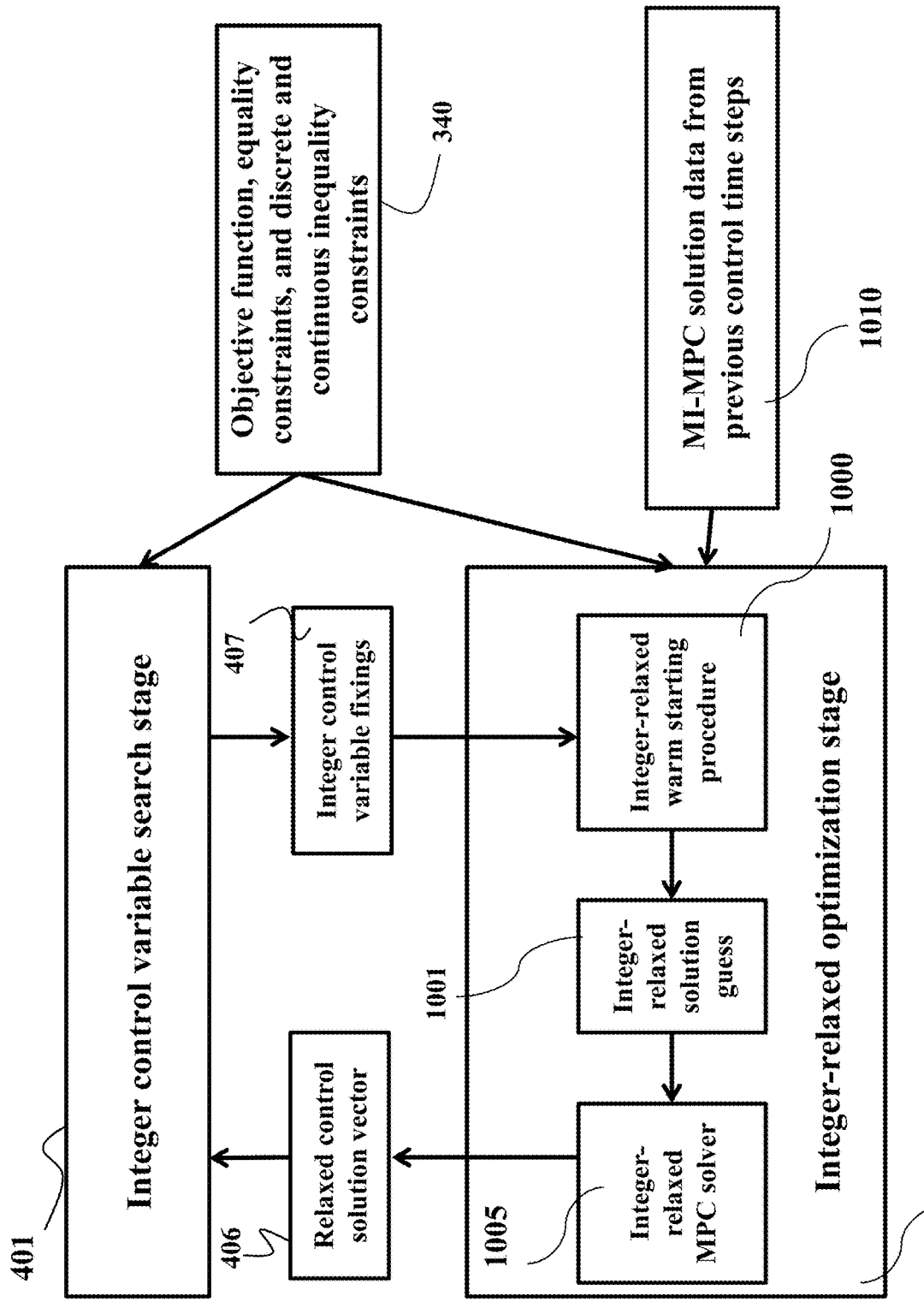
FIG. 10 is a block diagram of a warm starting strategy for the MPC solver in the integer-relaxed optimization stage, based on MI-MPC solution data from previous control time steps.

FIG. 10 shows a block diagram of a mixed-integer optimization strategy to implement the MI-MPC controller, based on an integer control variable search stage 401 and an integer-relaxed optimization stage 405. The search stage 401 is concerned with finding the (close to) optimal combination of discrete values in the discrete equality constraints 365 in order to compute the MI-MPC solution vector. In some embodiments, the search stage iteratively generates a sequence of integer-relaxed MPC optimization problems 405, by proposing particular integer control variable fixings 407, and relaxing the resulting mixed-integer program into a continuous optimization problem such that the relaxed control solution vector 406 provides a lower bound for the objective value in a particular region of the discrete search space.

Some embodiments use the MI-MPC solution data from one or multiple previous control time steps 1010 to compute an integer-relaxed solution guess 1001 that can be used to warm start the integer-relaxed MPC solver 1005 in order to reduce the computational effort for a particular region of the discrete search space, based on an integer-relaxed warm starting procedure 1000. In some embodiments, the integer-relaxed warm starting procedure 1000 is based on the identification of an integer-relaxed solution guess 1001 from solution data for a sufficiently similar region of the discrete search space that was computed at a previous control time step 1010. In some embodiments of the invention, the integer-relaxed warm starting procedure 1000 uses machine learning in order to compute an integer-relaxed solution guess 1001 that approximates the integer-relaxed control solution vector 406, given the mixed-integer program formulation 340, the integer control variable fixings 407 and a sufficiently large amount of solution data from previous control time steps 1010. For example, in some embodiments, the integer-relaxed warm starting procedure 1000 is based on a neural network that has been trained for the mixed-integer program formulation 340 with a sufficiently large amount of solution data 1010, corresponding to a range of different integer control variable fixings 407.

Figure 11:
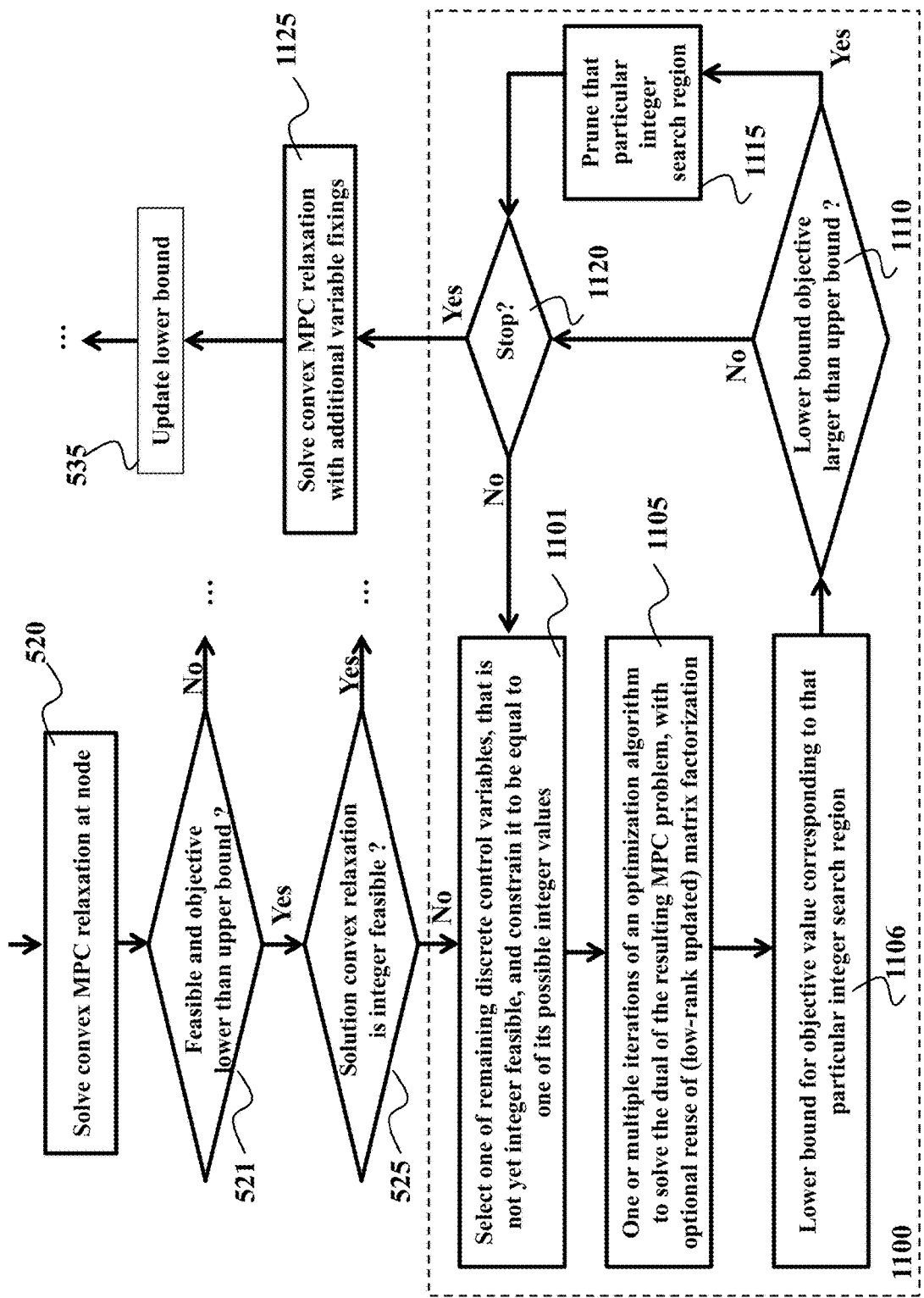
FIG. 11 is a block diagram of a post-solve method for MI-MPC, based on a subset of iterations of an optimization to solve the dual of the integer-relaxed MPC problem corresponding to fixings of discrete control variables.

FIG. 11 shows a block diagram of a post-solve branching technique 1100, according to some embodiments. These embodiments use the post-solve branching technique 1100 as part of the branch-and-bound optimization algorithm to implement the MI-MPC controller. Given the solution of an integer-relaxed convex MPC problem at the current node 520, in case the solution is feasible and the objective value is lower than the currently known upper bound value 521 and the solution is not yet integer feasible 525, then the post-solve branching technique aims to construct an integer-relaxed convex MPC problem solution with additional discrete variable fixings 1125, in order to increase the local lower bound on the objective value for that region of the discrete search space in a computationally efficient manner.

More specifically, the post-solve branching technique 1100 selects one of the remaining discrete control variables, that is not yet integer feasible in the relaxed MPC solution 520, and it iteratively proposes one of the remaining options to fix this discrete control variable, i.e., to constrain this variable to be equal to one of its possible integer values 1101. Some embodiments of the invention are based on a subset of iterations of an optimization algorithm to solve the dual of the resulting integer-relaxed MPC problem 1105 in order to compute a local lower bound on the objective value for that region of the discrete search space 1106. In some embodiments of the invention, a matrix factorization related to the optimality conditions, or a low-rank updated version of this matrix factorization, can be reused to efficiently perform the subset of iterations of an active-set optimization algorithm to solve the dual of the integer-relaxed MPC problem 1105 as part of the post-solve branching technique 1100.

If the computed lower bound is larger than the currently known upper bound value 1110, then this leads to pruning of a particular region of the discrete search space 1115 and potentially to additional discrete variable fixings 1125, which can considerably reduce the amount of computational effort that is required by the discrete control variable search stage of the MI-MPC controller. The post-solve branching technique 1100 iteratively continues to select discrete variables 1101 and construct lower bounds for the objective 1106 until a particular stopping criterion is satisfied 1120, e.g., until no relaxed discrete control variables remain or until a certain amount of execution time or a certain amount of iterations has been reached. If the stopping criterion 1120 of the post-solve branching technique 1100 has been satisfied, the branch-and-bound method continues by solving the resulting integer-relaxed convex MPC problem in case there are any additional discrete variable fixings 1125. The resulting relaxed MPC solution can be used to update the local lower bound value 535 in that particular region of the discrete search space, if the solution is feasible and the objective is lower than the currently known upper bound. Note that the relaxed MPC solution can be used to update the global upper bound value, if the solution is integer feasible and the objective is lower than the currently known upper bound.

Figure 12A:
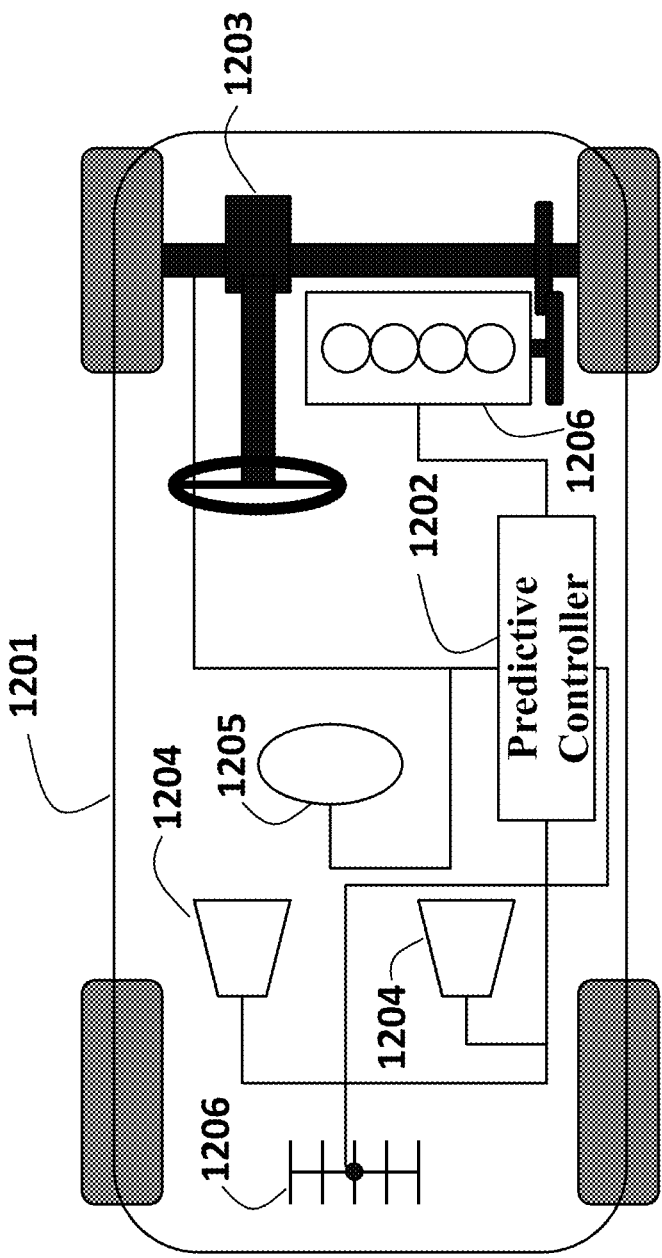
FIG. 12A is a schematic of a vehicle including a controller employing principles of some embodiments.

FIG. 12A shows a schematic of a vehicle 1201 including a predictive controller 1202 employing principles of some embodiments. As used herein, the vehicle 1201 can be any type of wheeled vehicle, such as a passenger car, bus, or rover. Also, the vehicle 1201 can be an autonomous or semi-autonomous vehicle. For example, some embodiments control the motion of the vehicle 1201. Examples of the motion include lateral motion of the vehicle controlled by a steering system 1203 of the vehicle 1201. In one embodiment, the steering system 1203 is controlled by the controller 1202. Additionally, or alternatively, the steering system 1203 can be controlled by a driver of the vehicle 1201.

The vehicle can also include an engine 1206, which can be controlled by the controller 1202 or by other components of the vehicle 1201. The vehicle can also include one or more sensors 1204 to sense the surrounding environment. Examples of the sensors 1204 include distance range finders, radars, lidars, and cameras. The vehicle 1201 can also include one or more sensors 1205 to sense its current motion quantities and internal status. Examples of the sensors 1205 include global positioning system (GPS), accelerometers, inertial measurement units, gyroscopes, shaft rotational sensors, torque sensors, deflection sensors, pressure sensor, and flow sensors. The sensors provide information to the controller 1202. The vehicle can be equipped with a transceiver 1206 enabling communication capabilities of the controller 1202 through wired or wireless communication channels.

Figure 12B:
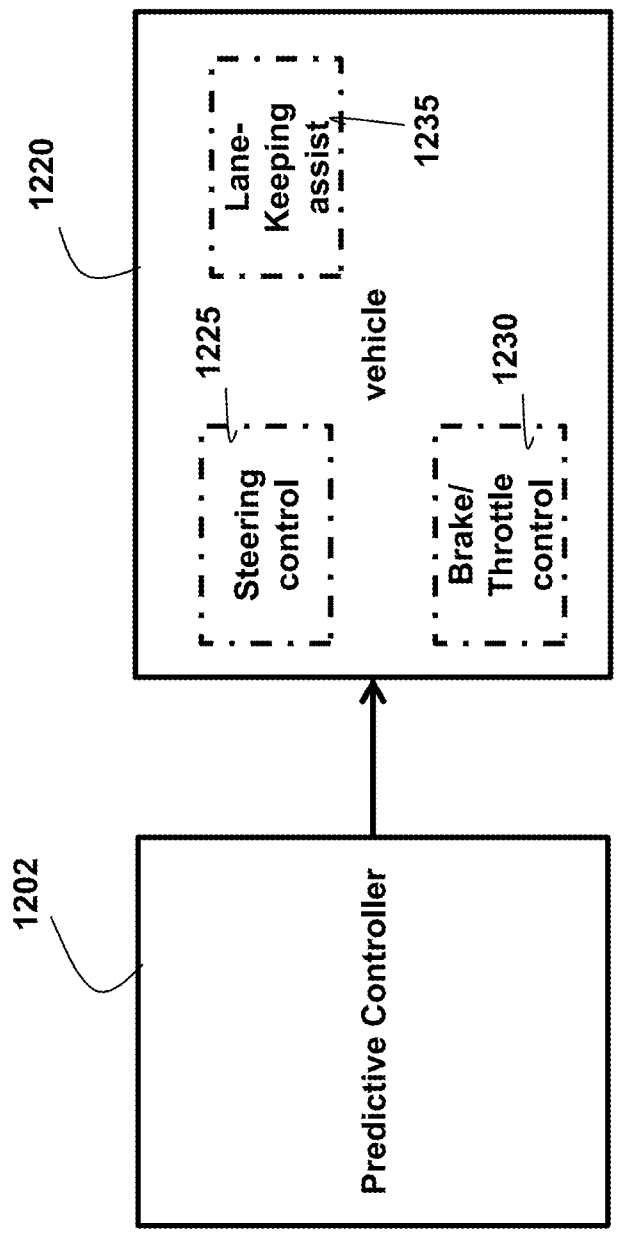
FIG. 12B is a schematic of interaction between the controller employing principles of some embodiments and controllers of the vehicle 1201 according to some embodiments.

FIG. 12B shows a schematic of interaction between the predictive controller 1202 and the controllers 1220 of the vehicle 1201 according to some embodiments. For example, in some embodiments, the controllers 1220 of the vehicle 1201 are steering 1225 and brake/throttle controllers 1230 that control rotation and acceleration of the vehicle 1220. In such a case, the predictive controller 1202 outputs control inputs to the controllers 1225 and 1230 to control the state of the vehicle. The controllers 1220 can also include high-level controllers, e.g., a lane-keeping assist controller 1235 that further process the control inputs of the predictive controller 1202. In both cases, the controllers 1220 maps use the outputs of the predictive controller 1202 to control at least one actuator of the vehicle, such as the steering wheel and/or the brakes of the vehicle, in order to control the motion of the vehicle.

Figure 12C:
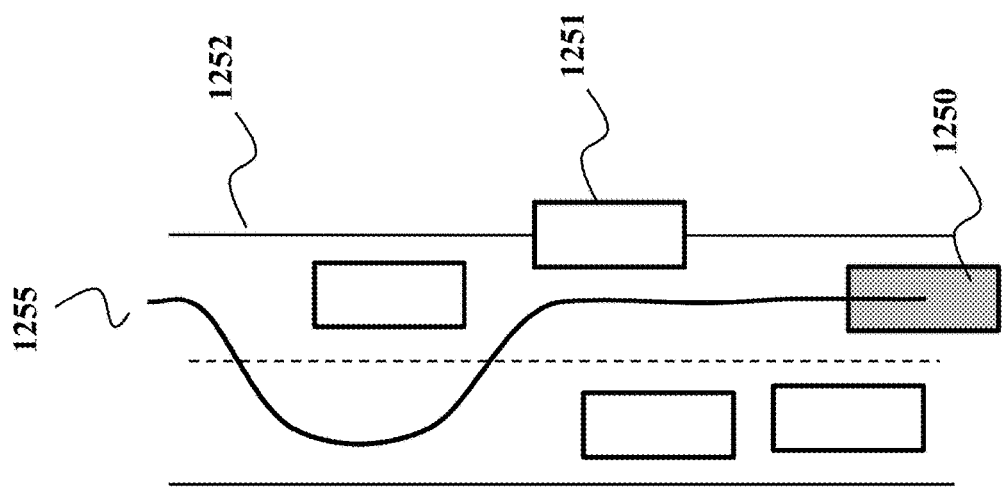
FIG. 12C is a schematic of a path and/or motion planning method for a controlled vehicle employing principles of some embodiments.

FIG. 12C shows a schematic of an autonomous or semi-autonomous controlled vehicle 1250 for which a dynamically feasible, and often optimal trajectory 1255 can be computed by using embodiments of this invention. The generated trajectory aims to keep the vehicle within particular road bounds 1252, and aims to avoid other uncontrolled vehicles, i.e., obstacles 1251 for the controlled vehicle 1250. In some embodiments, each of the obstacles 1251 can be represented by one or multiple inequality constraints in a time or space formulation of the mixed-integer optimal control problem, including one or multiple additional discrete variables for each of the obstacles. For example, based on embodiments configured to implement a mixed-integer model predictive controller, the autonomous or semi-autonomous controlled vehicle 1250 can make discrete decisions in real time such as, e.g., pass another vehicle on the left or on the right side or instead to stay behind another vehicle within the current lane of the road 1252.

Figure 13A:
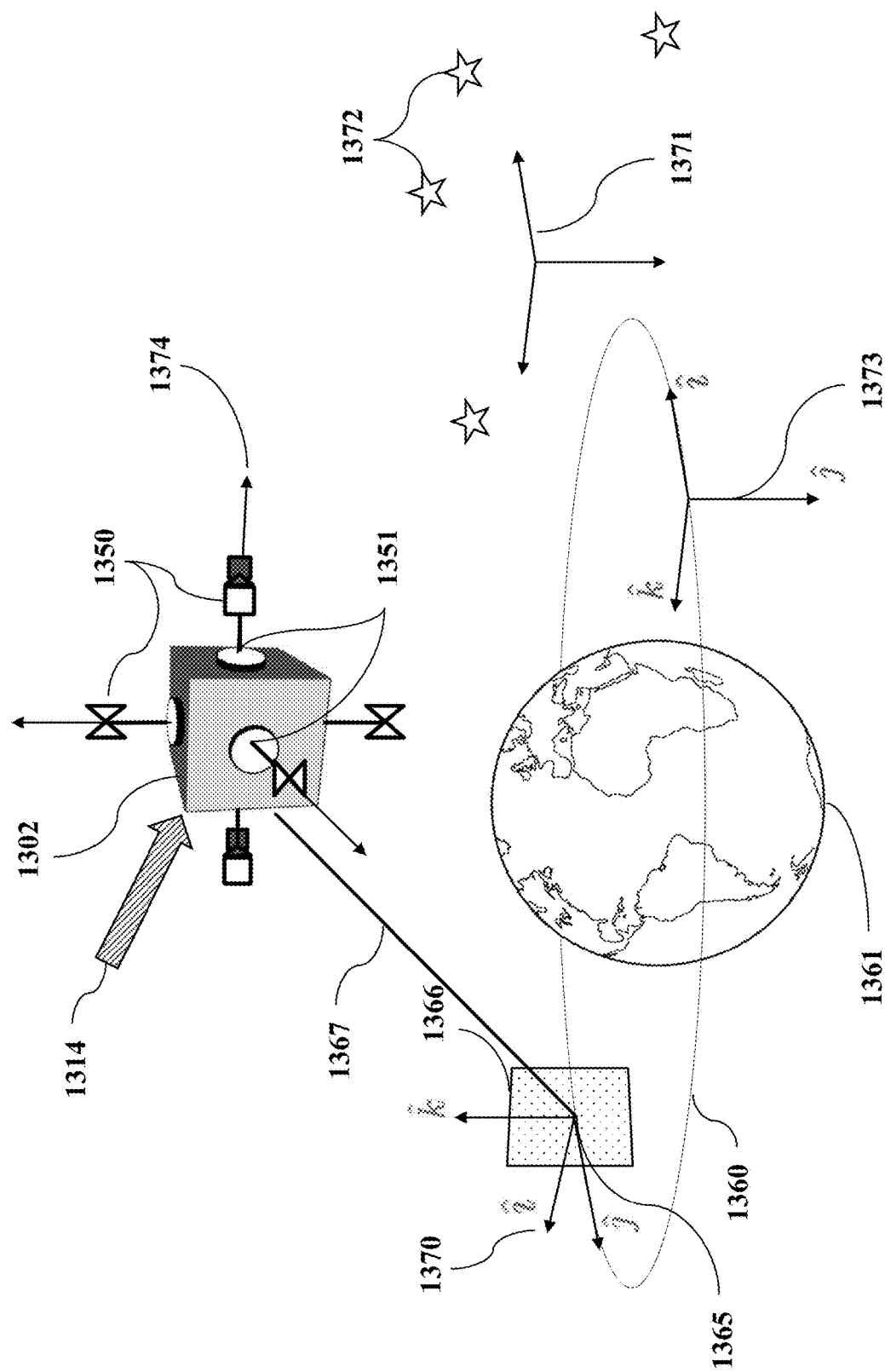
FIGS. 13A and 13B are schematics of the spacecraft mixed-integer predictive control problem formulation employing principles of some embodiments of the invention.
Figure 13B:
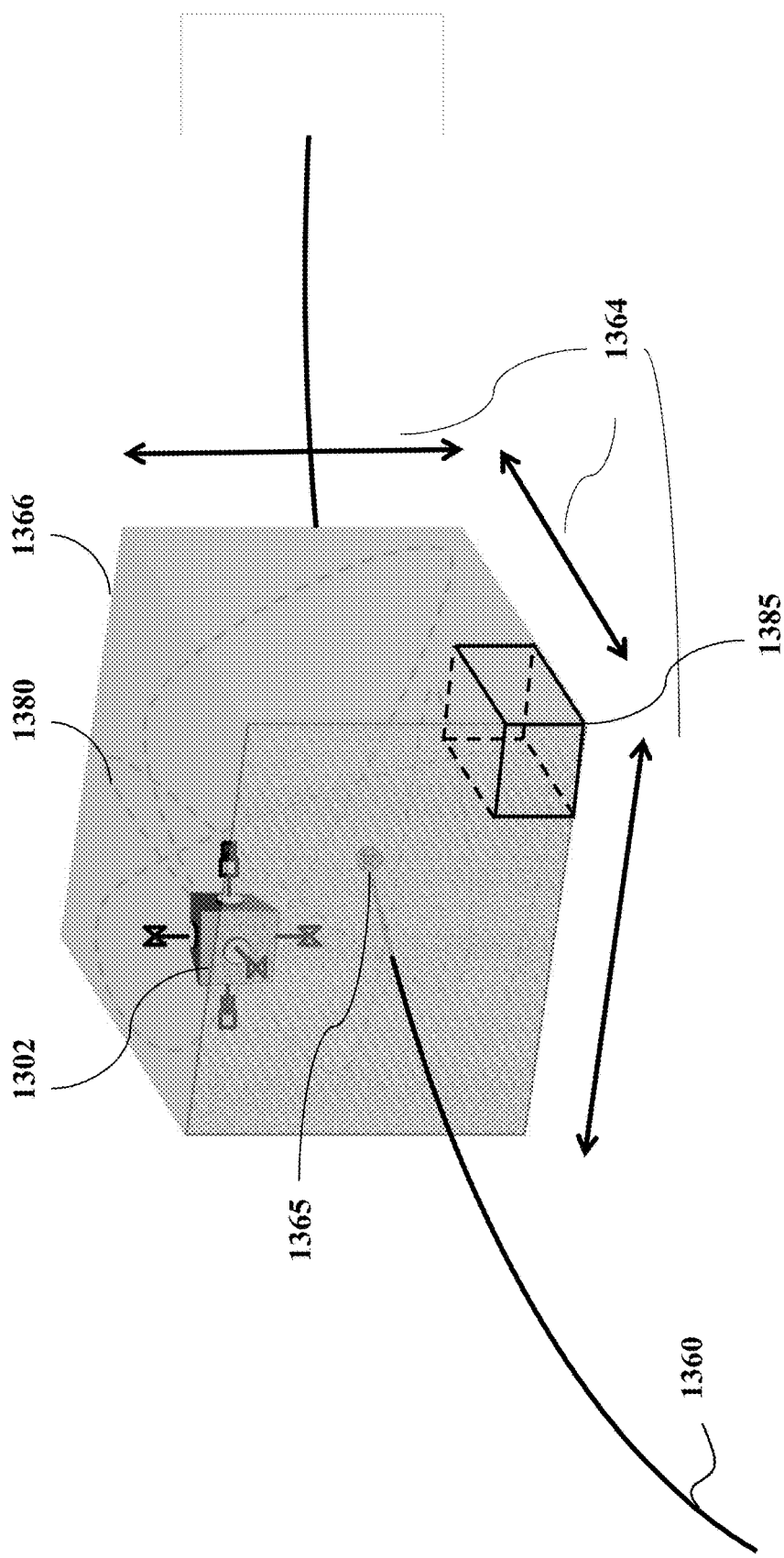

FIGS. 13A and 13B show a spacecraft 1302 equipped with a plurality of actuators such as thrusters 1350 and momentum exchange devices 1351. Examples of the type of momentum exchange devices include reaction wheels (RWs) and gyroscopes. The spacecraft is a vehicle, vessel, or machine designed to fly in outer space whose operation changes quantities such as the position of the spacecraft, its velocities, and its attitude or orientation, in response to commands that are sent to the actuators. When commanded, the actuators impart forces on the spacecraft that increase or decrease the velocity of the spacecraft and thus cause the spacecraft to translate its position, and, when commanded, the actuators also impart torques on the spacecraft, which cause the spacecraft to rotate and thereby change its attitude or orientation. As used herein, the operation of the spacecraft is determined by the operation of the actuators that determine a motion of the spacecraft that changes such quantities.

The spacecraft flies in outer space along an open or closed orbital path 1360 around, between, or near one or more gravitational bodies such as the Earth 1361, moon, and/or other celestial planets, stars, asteroids, comets. Usually, a desired or target position 1365 along the orbital path is given. A reference frame 1370 is attached to the desired position, where the origin of the frame, i.e., the all zeros coordinates in that reference frame are the coordinates of the desired position at all times.

The spacecraft is subject to various disturbance forces 1314. These disturbance forces can include forces that were not accounted for when determining the orbital path for the spacecraft. These disturbance forces act on the spacecraft to move the spacecraft away from the desired position on the orbital path. These forces can include, but are not limited to, gravitational attraction, radiation pressure, atmospheric drag, non-spherical central bodies, and leaking propellant. Thus, the spacecraft can be at a distance 1367 away from the target position.

Because of the disturbance forces, it is not always possible to keep the spacecraft at the desired position along its orbit. As such, it is desired that the spacecraft instead remains within a window 1366 with specified dimensions 1364 around the desired position. To that end, the spacecraft is controlled to move along any path 1380 that is contained within the desired target window. In this example, the window 1366 has a rectangular shape, but the shape of the window can vary for different embodiments.

The spacecraft is also often required to maintain a desired orientation. For example, a spacecraft-fixed reference frame 1374 is required to be aligned with a desired reference frame such as an inertial reference frame 1371 that is fixed relative to distant stars 1372, or a reference frame 1373 that is always oriented in a manner that points towards the Earth. However, depending on the shape of the spacecraft, different disturbance forces 1314 can act non-uniformly on the spacecraft, thereby generating disturbance torques, which cause the spacecraft to rotate away from its desired orientation. In order to compensate for the disturbance torques, momentum exchange devices 1351 such as reaction wheels are used to absorb the disturbance torques, thus allowing the spacecraft to maintain its desired orientation.

So that the momentum exchange devices do not saturate, and thereby lose the ability to compensate for disturbance torques, their stored momentum must be unloaded, e.g., by reducing spin rates of the reaction wheels. Unloading the momentum exchange devices imparts an undesired torque on the spacecraft. Such an undesired torque is also compensated for by the thrusters.

In some embodiments, the spacecraft can be modeled as a hybrid system and the commands that are sent to the actuators are computed using a predictive controller, such as the mixed-integer model predictive controller. For example, in some embodiments, the commands that are sent to the thrusters 1350 can only take a discrete set of values, and therefore resulting into a set of binary or integer control input variables for each stage within the mixed-integer control horizon.

In some embodiments, the predictive controller is designed such that the spacecraft remains outside of a particular zone 1385 with specified dimensions, close to the desired position along the orbit. The latter zone can be either fixed in time or it can be time varying, and is often referred to as an exclusion zone 1385, for which the corresponding logic inequality constraints can be modeled using an additional set of binary or integer control input variables for each stage within the mixed-integer control horizon. In this example, the exclusion zone 1385 has a rectangular shape, and it is positioned in a corner of the desired window 1366, but the shape and position of the exclusion zone within the desired target window can vary for different embodiments.

Figure 14A:
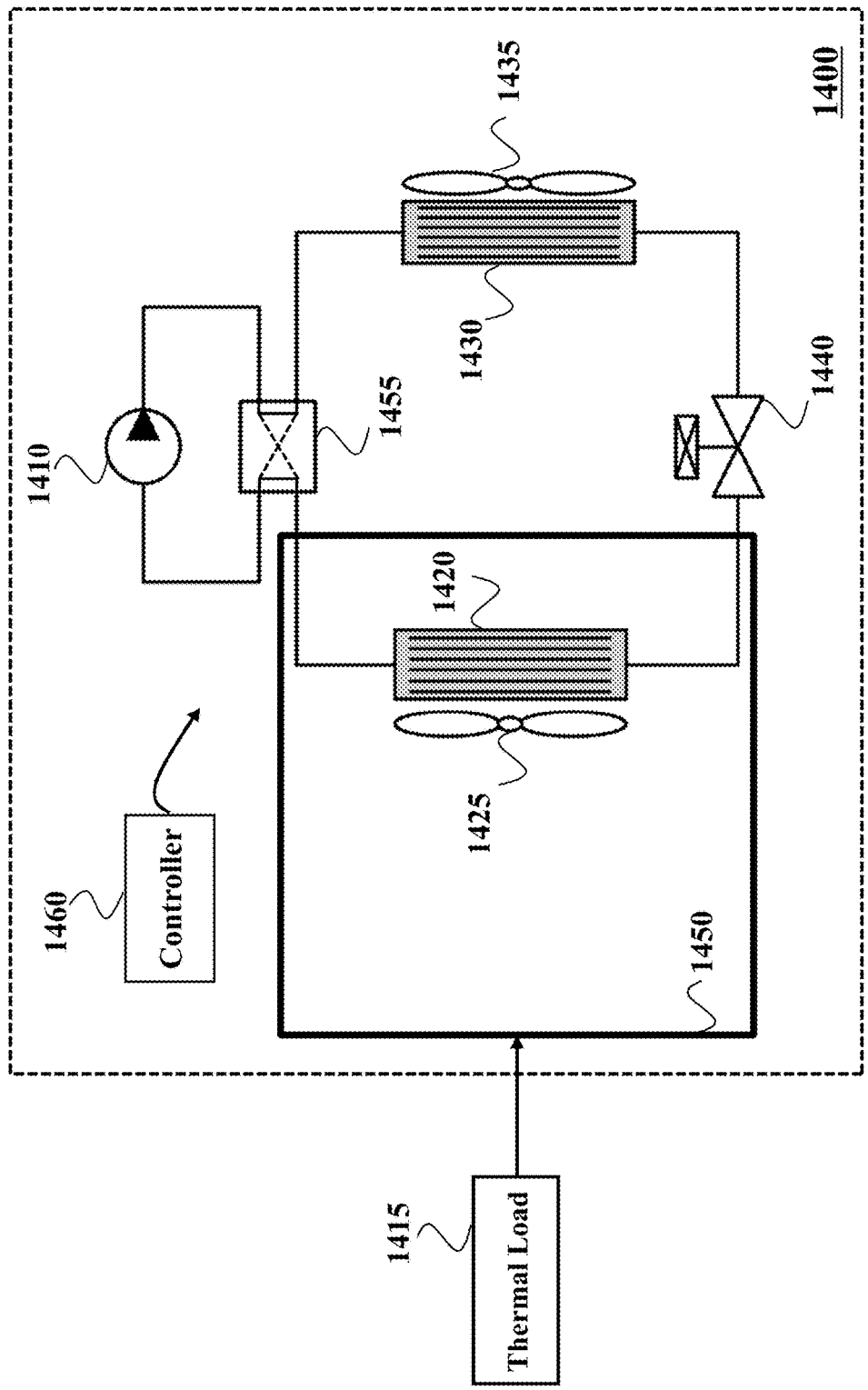
FIGS. 14A and 14B are schematics of a mixed-integer predictive control problem formulation for a vapor compression system (VCS), and an exemplary set of its components, employing principles of some embodiments of the invention.

FIG. 14A shows a schematic of a vapor compression system 1400 controlled by a controller 1460 according to some embodiments of the invention. The controller 1460 includes a predictive controller, such as a controller implementing a model predictive control (MPC). The components of the vapor compression system (VCS) 1400 can include an indoor heat exchanger 1420 located in an indoor space or zone 1450, an outdoor unit heat exchanger 1430 located in the ambient environment, a compressor 1410 and an expansion valve 1440. A thermal load 1415 acts on the indoor space or zone 1450.

Additionally, the VCS 1400 can include a flow reversing valve 1455 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 14B:
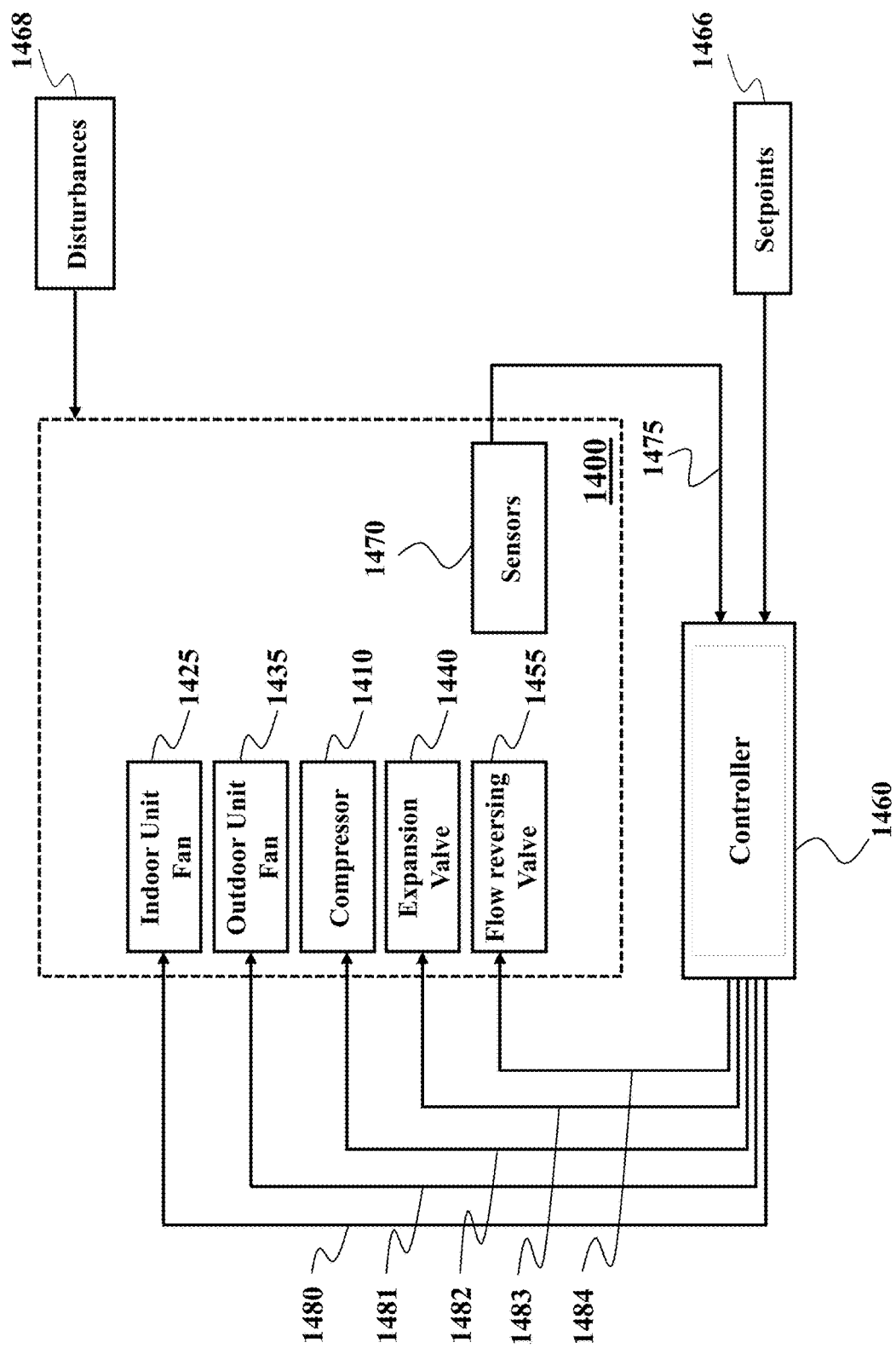

FIG. 14B shows an example of the configuration of signals, sensors, and controller used in the VCS 1400. A controller 1460 reads information from sensors 1470 configured to measure various temperatures, pressures, flow rates or other information about the operation of the system, including measurable disturbances such as the ambient air temperature. The controller can be provided with setpoints 1466 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 1480, an outdoor unit fan speed 1481, a compressor rotational speed 1482, an expansion valve position 1483, and a flow reversing valve position 1484. In this manner, the controller controls operation of the vapor compression system such that the setpoint values are achieved in the presence of disturbances 1468, such as a thermal load, acting on the system.

In some embodiments, the VCS can be modeled as a hybrid system and the commands that are sent to the actuators are computed using a predictive controller, such as the mixed-integer model predictive controller. For example, in some embodiments, the commands that are sent to the valves and/or the fans can only take a discrete set of values, and therefore resulting into a set of binary or integer control input variables for each stage within the mixed-integer control horizon.

In some embodiments, the dynamic behavior of the VCS can change rapidly or even switch at certain time instances, depending on the current state of the system and the current control input values. The resulting hybrid VCS system with switching dynamics can be modeled using an additional set of binary or integer control input variables for each stage within the mixed-integer control horizon.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A controller for controlling a system with continuous and discrete elements of operation, wherein at least a subset of control inputs for controlling the system are discrete variables assuming values belonging to a discrete set of values, comprising:
 a processor configured to accept measurements of a current state of the system, solve a mixed-integer model predictive control (MI-MPC) problem for each control step to produce control inputs to the system, and submit the control inputs to the system thereby changing the state of the system, wherein the processor solves the MI-MPC problem subject to state constraints on a state of the system, wherein for a current control step, the processor is configured to transform the state constraints into state-invariant control constraints on the control inputs to the system, such that any combination of values for the control inputs, resulting in a sequence of values for the state variables that satisfy the state constraints, also satisfy the state-invariant control constraints; and solve the MI-MPC problem subject to the state constraints and the state-invariant control constraints with a branch-and-bound method that searches for a solution of an MPC problem within a search space defined by relaxation of the discrete set of values into a partition of continuous search space that satisfies the state-invariant control constraints.

2. The controller of claim 1, wherein the processor, to solve the MI-MPC problem subject to the state-invariant control constraints is configured to select multiple combinations of different values for at least a subset of the control inputs with tightened control bounds values that satisfy the state-invariant control constraints;

solve an integer-relaxed optimization problem for each combination of different values for at least the subset of the control inputs to produce a set of solutions optimizing a performance metric according to an objective function of the MI-MPC problem; and select a solution of the MI-MPC problem from the set of solutions corresponding to an optimal value of the performance metric.

3. The controller of claim 1, wherein the branch-and-bound method iteratively partitions the search space until the solution of the MPC problem belonging to the discrete set of values is found, wherein the state-invariant control constraints tighten the search space to reduce the number of MPC problems that need to be solved in order to find an optimal solution, and wherein each relaxed MPC problem is solved subject to the state constraints.

4. The controller of claim 1, wherein at least some of the state-invariant control constraints are coupled with each other for some or all time instances of a control horizon of the MPC problem, wherein the processor decouples the state-invariant control constraints to form the search space.

5. The controller of claim 4, wherein the processor decouples the state-invariant control constraints for different time instances of the control horizon using a domain propagation method that iteratively tightens a set of conservative bound values for each of the control inputs, representing the decoupled state-invariant control constraints, given an initial set of control bounds as well as the state-invariant control constraints that are coupled with each other for some or all time instances of a control horizon of the MPC problem.

6. The controller of claim 1, wherein the branch-and-bound method iteratively partitions the search space into a nested tree of regions including a first region and a second region nested in a common region, and wherein the processor is configured to solve the MPC problem for a first partition of the search space defined by the first region to produce a first solution;

solve the MPC problem for a second partition of the search space defined by the second region to produce a second solution;

compare both the first and the second solution with the currently known bound to the optimal objective value;

prune either the first, the second or both regions from the nested tree of regions when their performance metric is less optimal than the currently known bound to the optimal objective value;

update the currently known bound value to the optimal objective in case either the first or the second partition results in a discrete feasible solution to the MI-MPC problem; and select and partition one remaining region into multiple nested regions and solve MPC problems for at least some of the multiple nested regions until the optimal solution belonging to the discrete set of values is found.

7. The controller of claim 1, wherein the branch-and-bound method iteratively partitions the search space into a nested tree of regions to find an optimal solution of the MPC problem within the search space that belongs to the discrete set of values, wherein, to perform an iteration, the processor is configured to solve the MPC problem for a leaf region of the nested tree defining a partition of the search space to find a solution of the MPC problem for the nested region;

compare the solution of the MPC problem for the leaf region with the currently known best discrete feasible solution of the MI-MPC problem for the nested tree of regions;

update the best bound value for the discrete feasible solution of the MI-MPC problem for the nested tree of regions with the solution of the MPC problem for the leaf region, if the solution of the MPC problem for the leaf region is discrete feasible and more optimal than the currently known best discrete feasible solution of the MI-MPC problem for the nested tree of regions; and prune the leaf region from the nested tree of regions if the performance metric for the solution of the MPC problem for the leaf region is less optimal than the currently known best discrete feasible MI-MPC solution.

8. The controller of claim 7, wherein the branch-and-bound method uses a tree propagation to initialize the solution of the MI-MPC problem and the corresponding nested tree of regions for the current control step with a one-step ahead time prediction from the solution of the MI-MPC problem and the corresponding nested tree of regions determined for a previous control time step.

9. The controller of claim 8, wherein the processor, to initialize the branch-and-bound method using the tree propagation is configured to initialize a current nested tree of regions of the current control time step, wherein the initialized current nested tree of regions defines branching variables and corresponding pseudo-cost information for each of the discrete variables, with an order of the branching variables and pseudo-cost information from the solution of the MI-MPC problem and a corresponding previous nested tree of regions determined for the previous control time step;

shift an index of the branched variables by one stage in a control horizon of the MPC problem for the current control time step along a solution path in the previous nested tree of regions determined for the previous control time step;

remove the branched variables from the current nested tree of regions that are associated with a stage that falls outside of the horizon for the current control time step, after shifting the index of the branched variables;

remove the branched variables from the current nested tree of regions for which the values are already integer feasible in a relaxed MPC solution;

remove the branched variables from the current nested tree of regions for which the pseudo-cost information indicates insufficient branching during previous control time steps.

10. The controller of claim 8, wherein the processor is further configured to warm start a current solution for each MPC solution in the current nested tree of regions, based on previous MPC solutions from the previous control time steps.

11. The controller of claim 2, wherein the processor is further configured to perform a post-solve method after solving the MPC problem for at least one combination of values for at least the subset of the discrete control inputs if the corresponding MPC solution is not yet integer feasible for all discrete control inputs and if the performance metric for the solution of the MPC problem is more optimal than the currently known best discrete feasible MI-MPC solution, wherein for performing the post-solve method the processor is configured to:

perform a subset of iterations of an optimization of a dual of the MPC problem for a search region, in which one of the discrete control input variables that is not yet integer feasible is selected and constrained to be equal to one of its discrete set of values;

prune the search region, if the performance metric after the subset of iterations of the optimization of the dual of the MPC problem is less optimal than a current best discrete feasible MI-MPC solution; and fix the discrete control input variable to a particular integer value if the regions corresponding to all other possible integer values for this discrete control input variable have already been pruned.

12. The controller of claim 11, wherein each MPC problem for a combination of values for at least the subset of the discrete control inputs is solved using an active-set method and the post-solve method corresponds to a subset of dual active-set iterations that can reuse a matrix factorization or a low-rank updated version of the matrix factorization for a system matrix when solving a linear system of optimality conditions corresponding to the dual of the MPC problem.

13. The controller of claim 1, wherein the controlled system is a vehicle, and wherein the controller determines an input to the vehicle based on the mixed-integer control solution, wherein the input to the vehicle includes one or a combination of an acceleration of the vehicle, an engine torque of the vehicle, brake torques, and a steering angle, and the discrete optimization variables are used to model one or a combination of discrete control decisions, switching in the system dynamics, gear shifting, and obstacle avoidance constraints.

14. A vehicle including the controller of claim 1.

15. The controller of claim 1, wherein the control system is a spacecraft, and wherein the controller determines an input to the spacecraft based on the mixed-integer control solution, wherein the input to the spacecraft actuates one or a combination of thrusters and momentum exchange devices, and the discrete optimization variables are used to model one or a combination of discrete control decisions, switching in the system dynamics, integer values for the thruster commands, and obstacle avoidance constraints.

16. The predictive controller of claim 1, wherein the control system is a vapor compression system, and wherein the controller determines an input to the vapor compression system based on the mixed-integer control solution, wherein the input to the vapor compression system includes one or a combination of an indoor unit fan speed, an outdoor unit fan speed, a compressor rotational speed, an expansion valve position, and a flow reversing valve position, and the discrete optimization variables are used to model one or a combination of discrete control decisions, switching in the system dynamics, and integer values for the commands that are sent to the valves and/or to the fans.

17. A method for controlling a system with continuous and discrete elements of operation, wherein at least a subset of the control inputs for controlling the system are discrete variables assuming values belonging to a discrete set of values, wherein the method uses a processor coupled with stored instructions implementing the method, wherein the instructions, when executed by the processor carry out steps of the method, comprising:

accepting measurements of a state of the system;

solving a mixed-integer model predictive control (MI-MPC) problem subject to state constraints on the state of the system to produce control inputs to the system; and submitting the control inputs to the system thereby changing the state of the system, wherein solving the MI-MPC problem comprises:

transforming the state constraints into state-invariant control constraints on the control inputs to the system, such that any combination of values for the control inputs, resulting in a sequence of values for the state variables that satisfy the state constraints, also satisfy the state-invariant control constraints; and solving the MI-MPC problem subject to the state constraints and the state-invariant control constraints, wherein the MI-MPC problem is solved with a branch-and-bound method that searches for a solution of an MPC problem within a search space defined by relaxation of the discrete set of values into a partition of continuous search space that satisfies the state-invariant control constraints.

18. A non-transitory computer readable storage medium embodied thereon a program executable by a processor for performing a method, the method comprising:

accepting measurements of a state of the system;

solving a mixed-integer model predictive control (MI-MPC) problem subject to state constraints on the state of the system to produce control inputs to the system; and submitting the control inputs to the system thereby changing the state of the system, wherein solving the MI-MPC problem comprises:

transforming the state constraints into state-invariant control constraints on the control inputs to the system, such that any combination of values for the control inputs, resulting in a sequence of values for the state variables that satisfy the state constraints, also satisfy the state-invariant control constraints; and solving the MI-MPC problem subject to the state constraints and the state-invariant control constraints, wherein the MI-MPC problem is solved with a branch-and-bound method that searches for a solution of an MPC problem within a search space defined by relaxation of the discrete set of values into a partition of continuous search space that satisfies the state-invariant control constraints.

19. A controller for controlling a system with continuous and discrete elements of operation, wherein at least a subset of control inputs for controlling the system are discrete variables assuming values belonging to a discrete set of values, comprising:

a processor configured to accept measurements of a current state of the system, solve a mixed-integer model predictive control (MI-MPC) problem for each control step to produce control inputs to the system, and submit the control inputs to the system thereby changing the state of the system, wherein the processor solves the MI-MPC problem subject to state constraints on a state of the system, wherein for a current control step, the processor is configured to transform the state constraints into state-invariant control constraints on the control inputs to the system, such that any combination of values for the control inputs, resulting in a sequence of values for the state variables that satisfy the state constraints, also satisfy the state-invariant control constraints; and solve the MI-MPC problem subject to the state constraints and the state-invariant control constraints, wherein the processor, to solve the MI-MPC problem subject to the state-invariant control constraints is configured to select multiple combinations of different values for at least a subset of the control inputs with tightened control bounds values that satisfy the state-invariant control constraints;

solve an integer-relaxed optimization problem for each combination of different values for at least the subset of the control inputs to produce a set of solutions optimizing a performance metric according to an objective function of the MI-MPC problem; and select a solution of the MI-MPC problem from the set of solutions corresponding to an optimal value of the performance metric, wherein the processor is further configured to perform a post-solve method after solving the MPC problem for at least one combination of values for at least the subset of the discrete control inputs if the corresponding MPC solution is not yet integer feasible for all discrete control inputs and if the performance metric for the solution of the MPC problem is more optimal than the currently known best discrete feasible MI-MPC solution, wherein for performing the post-solve method the processor is configured to:

perform a subset of iterations of an optimization of a dual of the MPC problem for a search region, in which one of the discrete control input variables that is not yet integer feasible is selected and constrained to be equal to one of its discrete set of values;

prune the search region, if the performance metric after the subset of iterations of the optimization of the dual of the MPC problem is less optimal than a current best discrete feasible MI-MPC solution; and fix the discrete control input variable to a particular integer value if the regions corresponding to all other possible integer values for this discrete control input variable have already been pruned.

* * * * *